Figure 1:
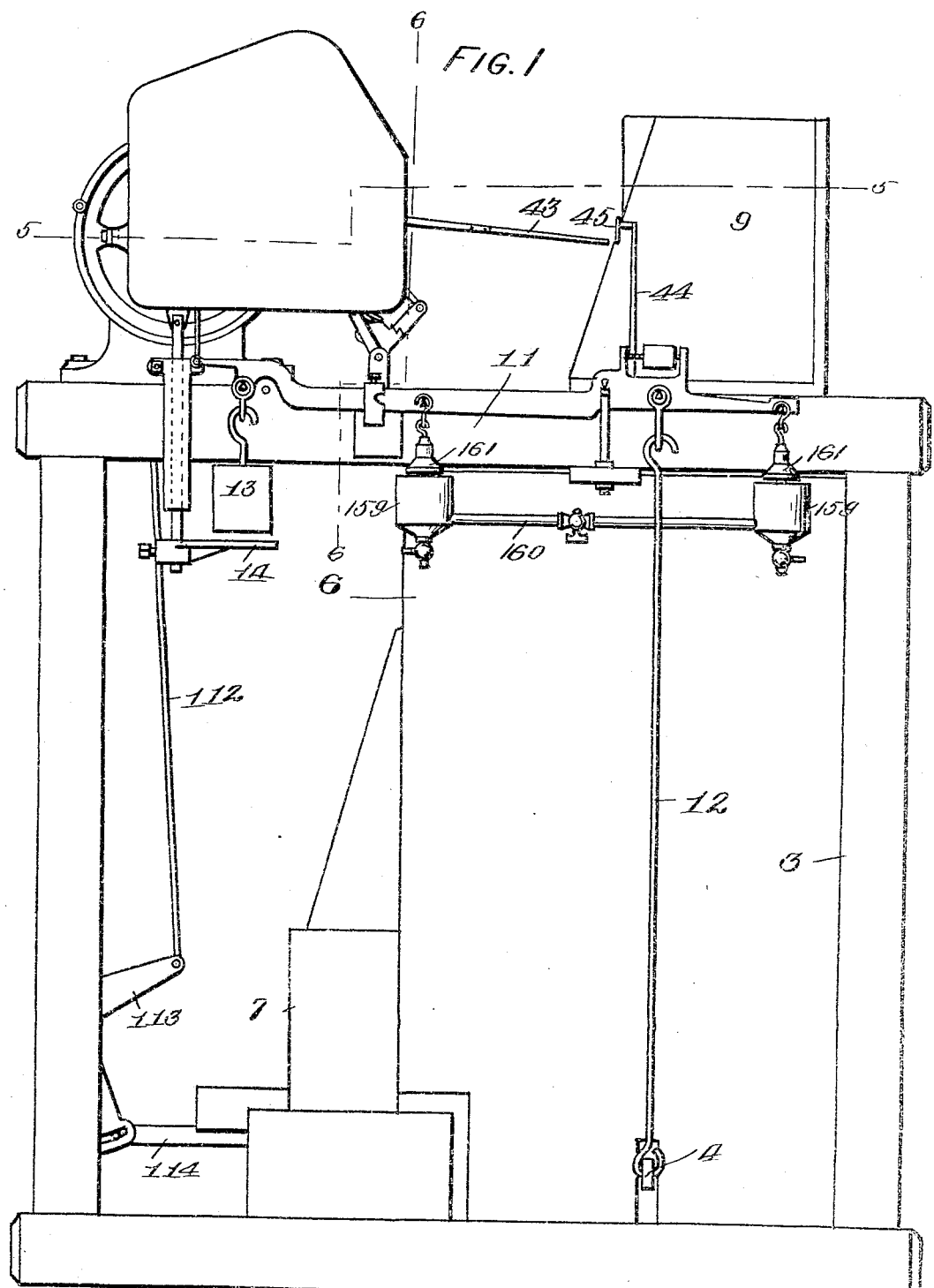

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.

NO MODEL. 15 SHEETS—SHEET 1.

Witnesses
E. J. Stann

Inventor.
Ulysses S. James,
By James L. Norris
Attys

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL. 15 SHEETS—SHEET 3.

Witnesses
Inventor
Ulysses S. James
By James L. Norris
attorney

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL. 15 SHEETS—SHEET 7.

Witnesses
E. G. Staude

Inventor
Ulysses S. James
By James L. Norris
attorney

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL. 15 SHEETS—SHEET 9.

Witnesses.
E. G. Stause
H. B. Keefer

Inventor.
Ulysses S. James.
By James L. Norris.
Atty.

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL. 15 SHEETS—SHEET 11.

Witnesses
E. G. Staude

Inventor
Ulysses S. James
By James L. Norris
attorney

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL.
15 SHEETS—SHEET 12.

Witnesses
E. G. Staude
J. B. Keefer

Inventor
Ulysses S. James
By James L. Norris
attorney

No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL. 15 SHEETS—SHEET 13.
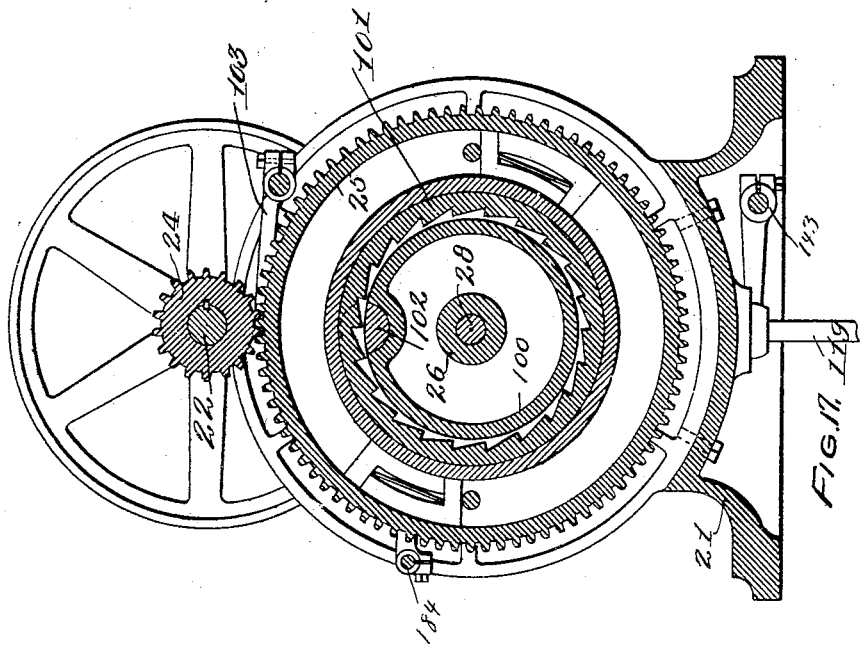
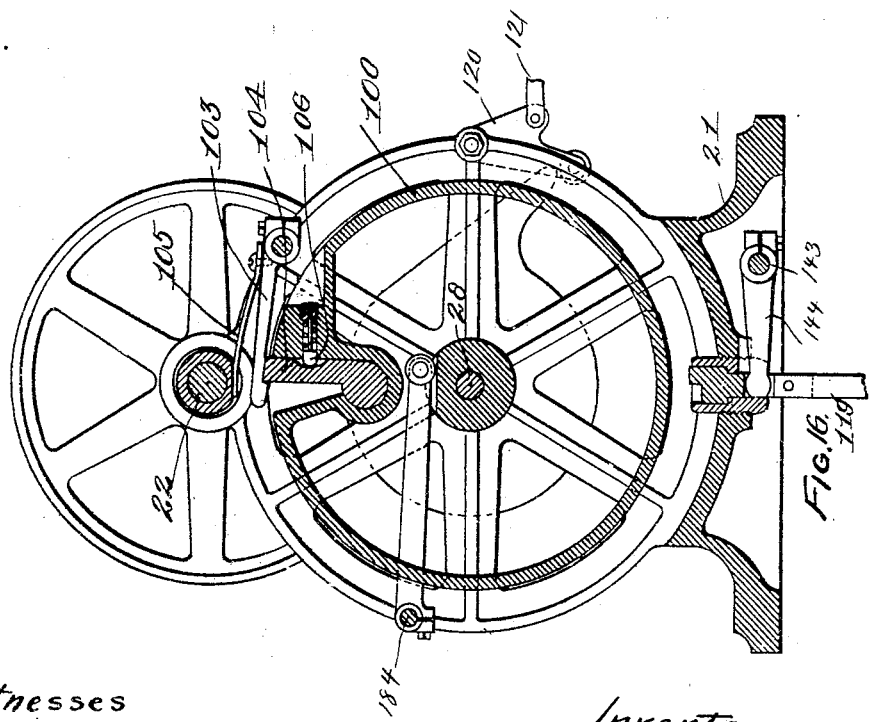
Witnesses
E. G. Staude
Inventor
Ulysses S. James
By James L. Norris
attorney No. 764,192. PATENTED JULY 5, 1904.
U. S. JAMES.
AUTOMATIC TESTING AND RECORDING MACHINE FOR WEIGHING MACHINES OR SCALES.
APPLICATION FILED OCT. 10, 1902. RENEWED NOV. 30, 1903.
NO MODEL. 15 SHEETS—SHEET 14.
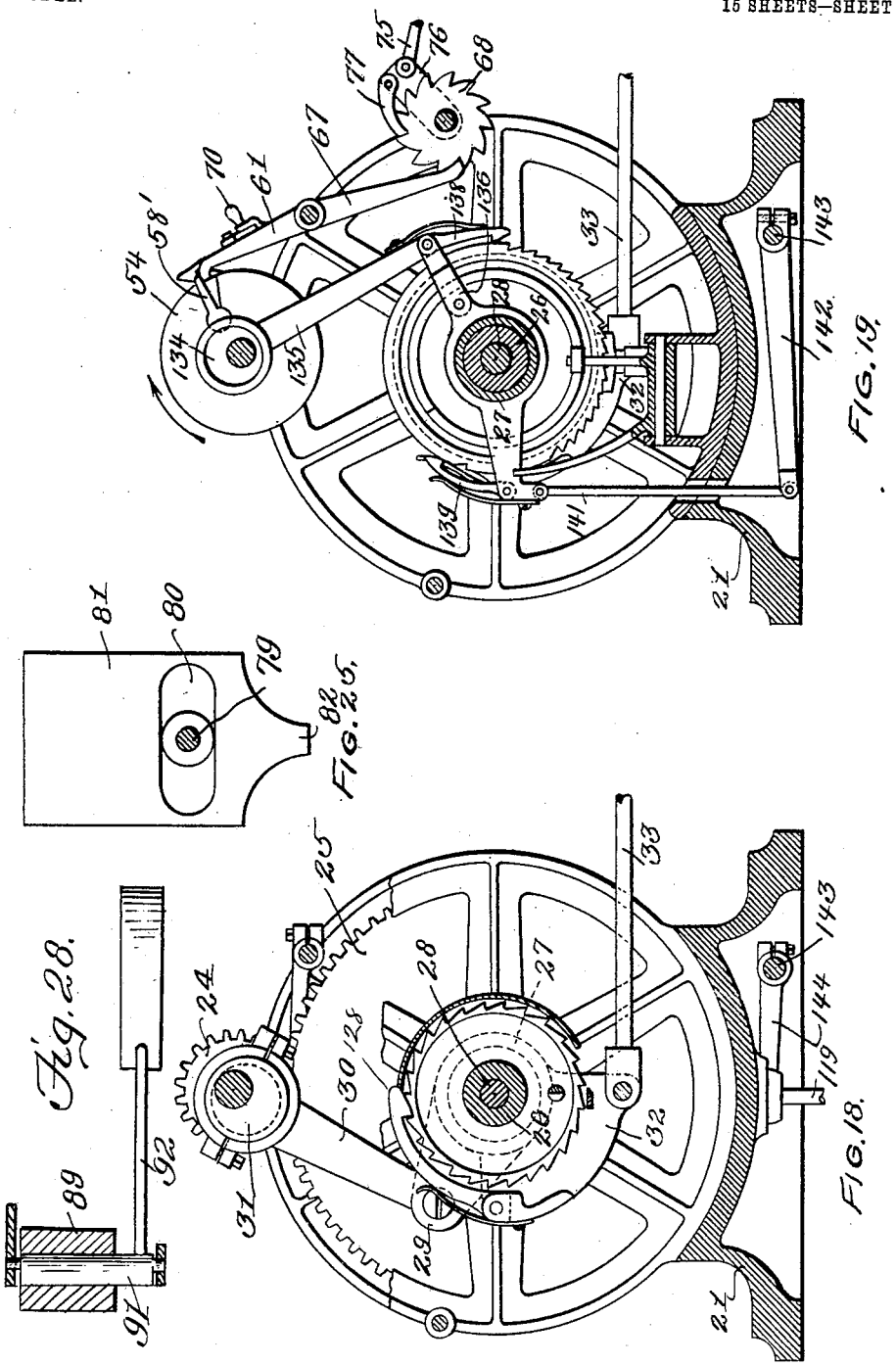
Witnesses
Inventor
Ulysses S. James
By James L. Norris
attorney

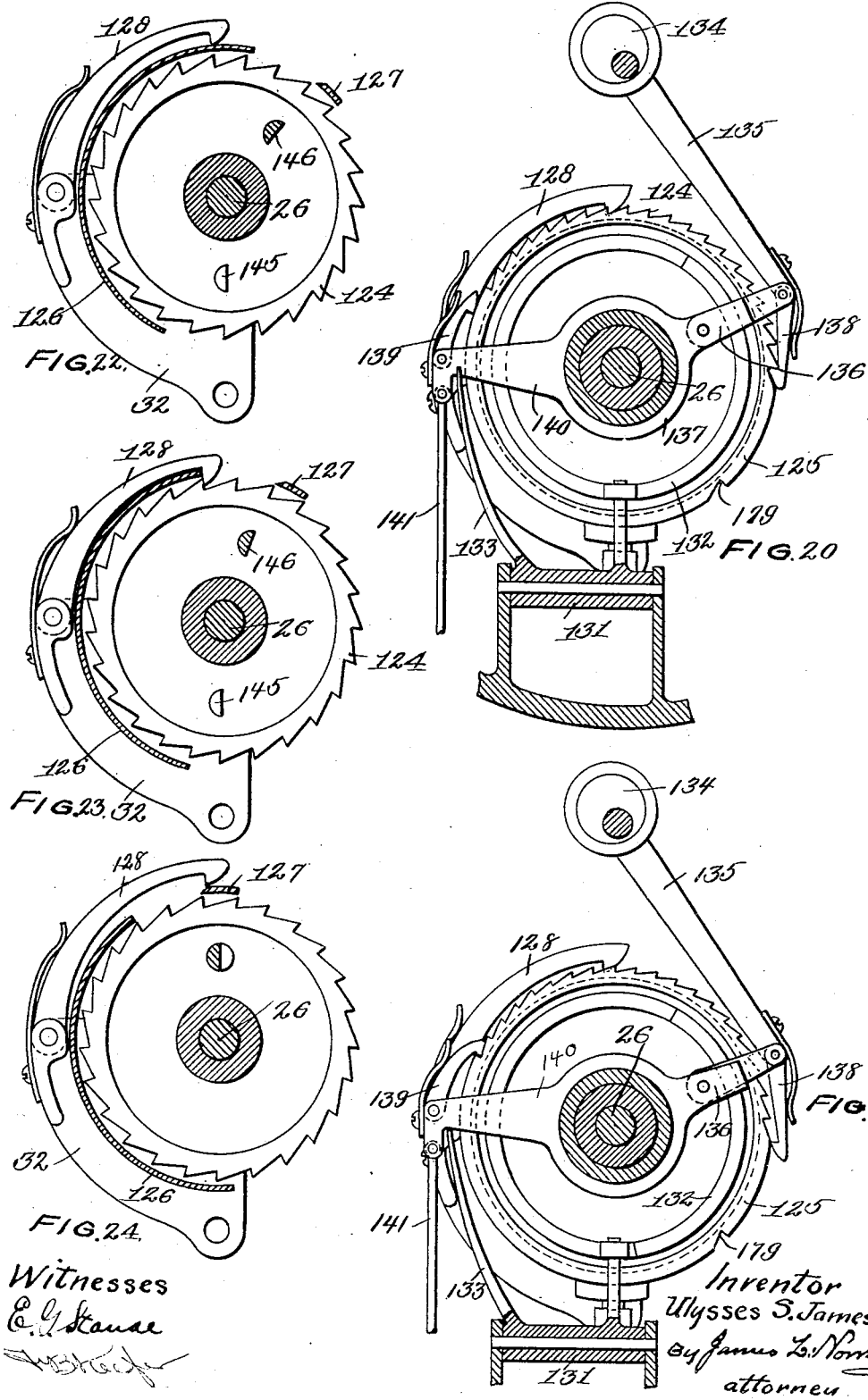

No. 764,192. Patented July 5, 1904.

UNITED STATES PATENT OFFICE.

ULYSSES S. JAMES, OF ANACONDA, MONTANA, ASSIGNOR, BY DIRECT AND MESNE ASSIGNMENTS, TO THE JAMES AUTOMATIC TESTING AND RECORDING SCALE COMPANY, A CORPORATION OF ILLINOIS.

AUTOMATIC TESTING AND RECORDING MACHINE FOR WEIGHING MACHINES OR SCALES.

SPECIFICATION forming part of Letters Patent No. 764,192, dated July 5, 1904.

Application filed October 10, 1902. Renewed November 30, 1903. Serial No. 183,290. (No model.)

*To all whom it may concern:*

Be it known that I, ULYSSES S. JAMES, a citizen of the United States, residing at Anaconda, in the county of Deerlodge and State of Montana, have invented new and useful Improvements in Automatic Testing and Recording Machines for Weighing Machines or Scales, of which the following is a specification.

This invention relates to an automatic testing and recording machine for weighing machines or scales, it having means for effecting automatically and positively the action of the feed-controller and discharge-controller of said weighing machine or scale, said first-mentioned machine being capable of efficient use with a weighing machine or scale of any kind or character. The working parts of the machine are so organized that the action of the feed and discharge controllers is caused absolutely and automatically in sequence, so as to secure results equaling in accuracy hand-weighing, but very much more rapidly than the latter. The machine also has means for recording the loads after they are weighed, so that a printed record is secured, and it also has means for testing the balance or poise of the weighing-machine to thereby indicate whether the same is weighing heavy or light, these facts being indicated by an auxiliary recording mechanism, and the several operations before described are timed to occur by means governed by the operation of the weighing mechanism, as will hereinafter appear.

In the drawings accompanying and forming a part of this specification I show a machine including my invention; but I desire to state at this point that said invention is not limited to the parts nor to their arrangement in the manner hereinafter set forth, for many variations as to these and other points may be adopted within the scope of the claims following the description of said invention.

Figure 2:
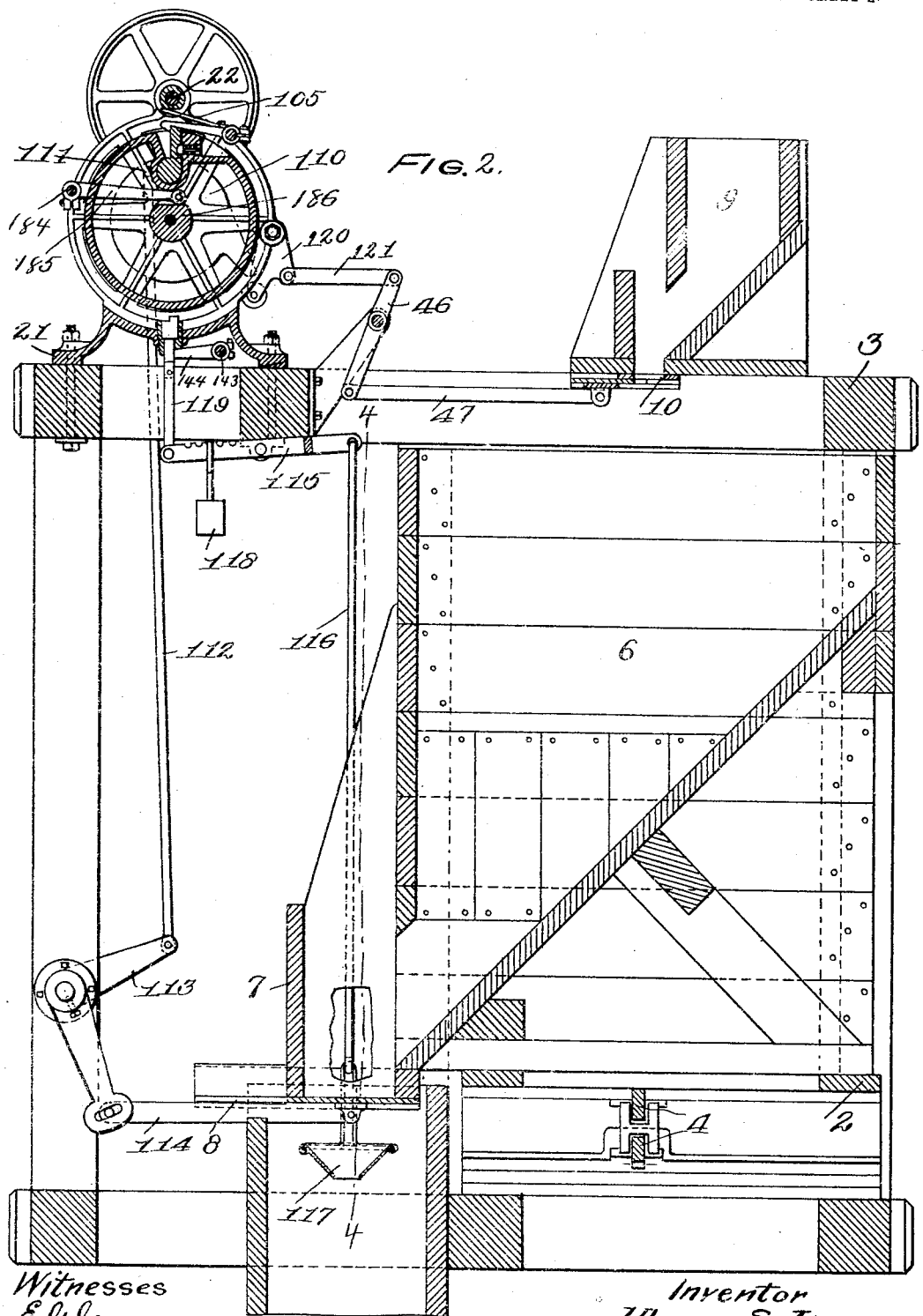
Figure 3:
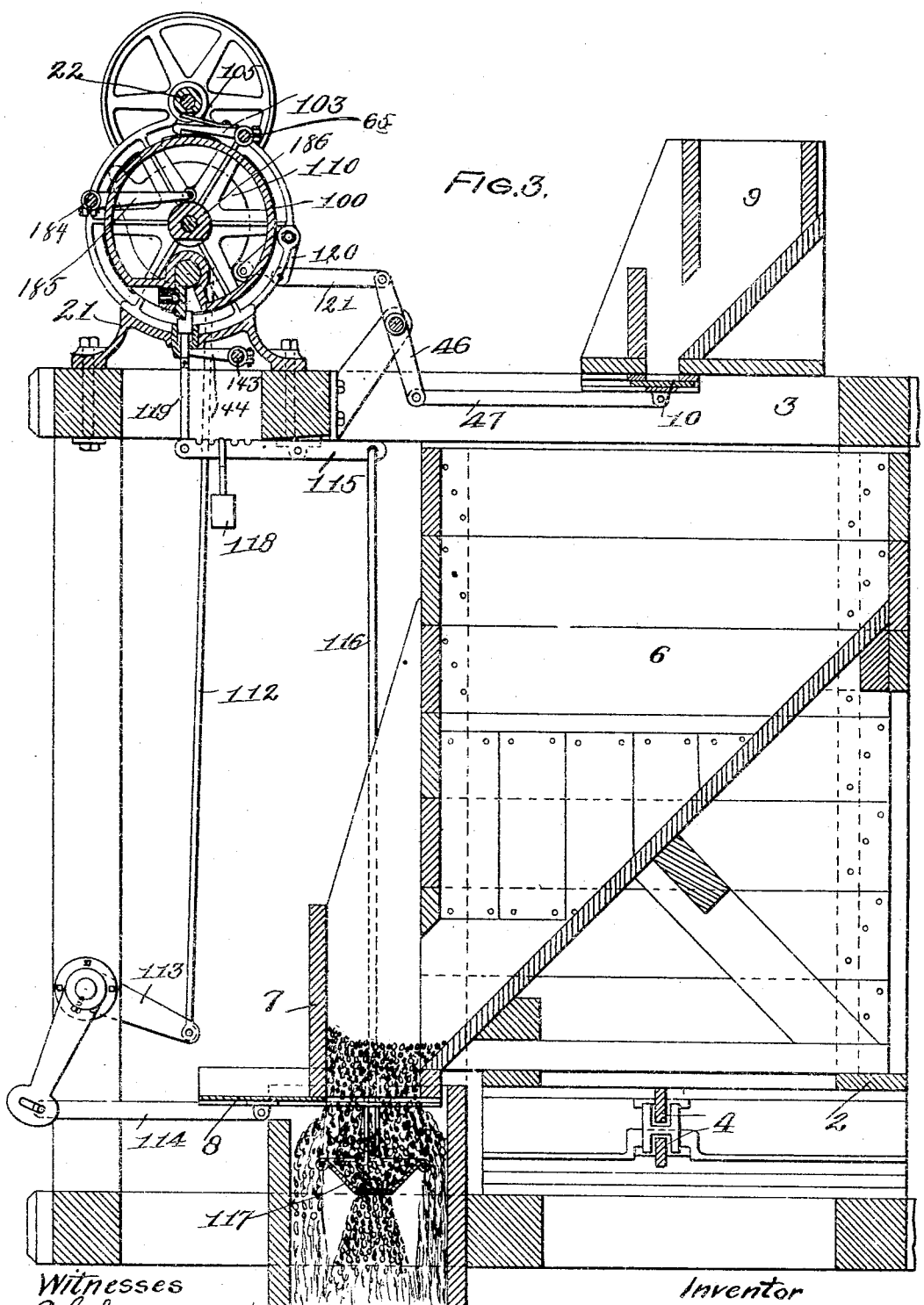
Figure 4:
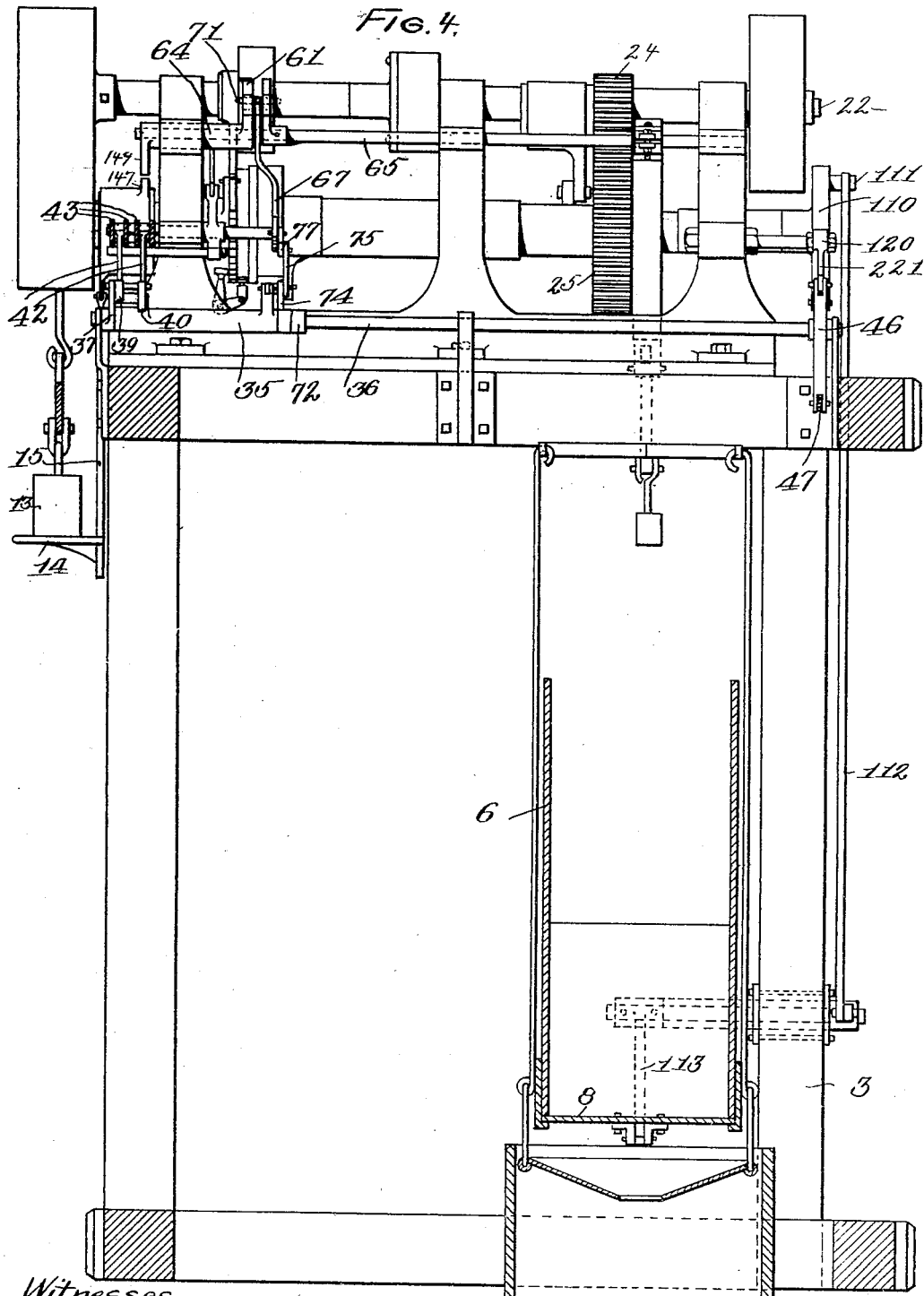
Figure 5:
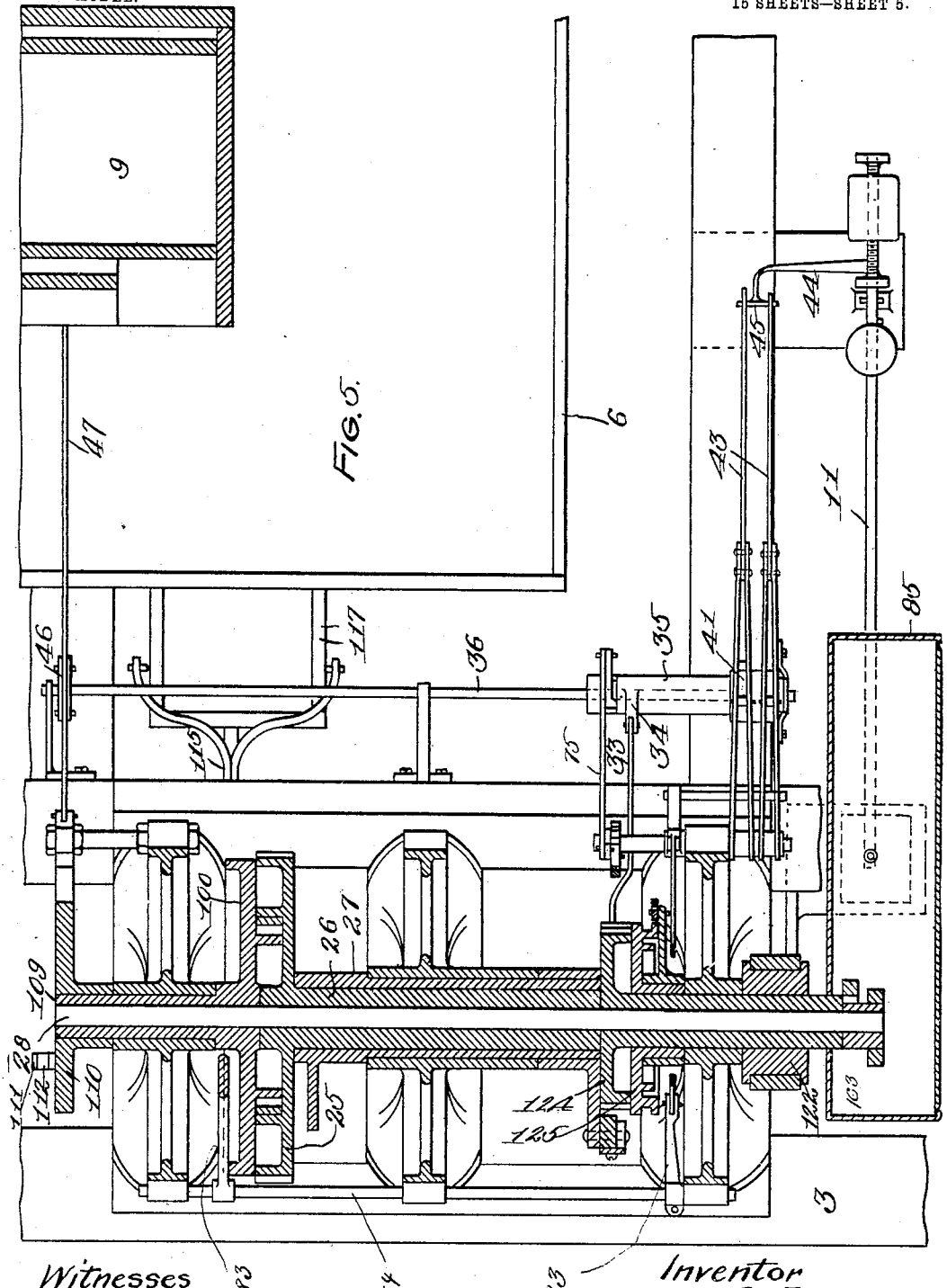
Figure 6:
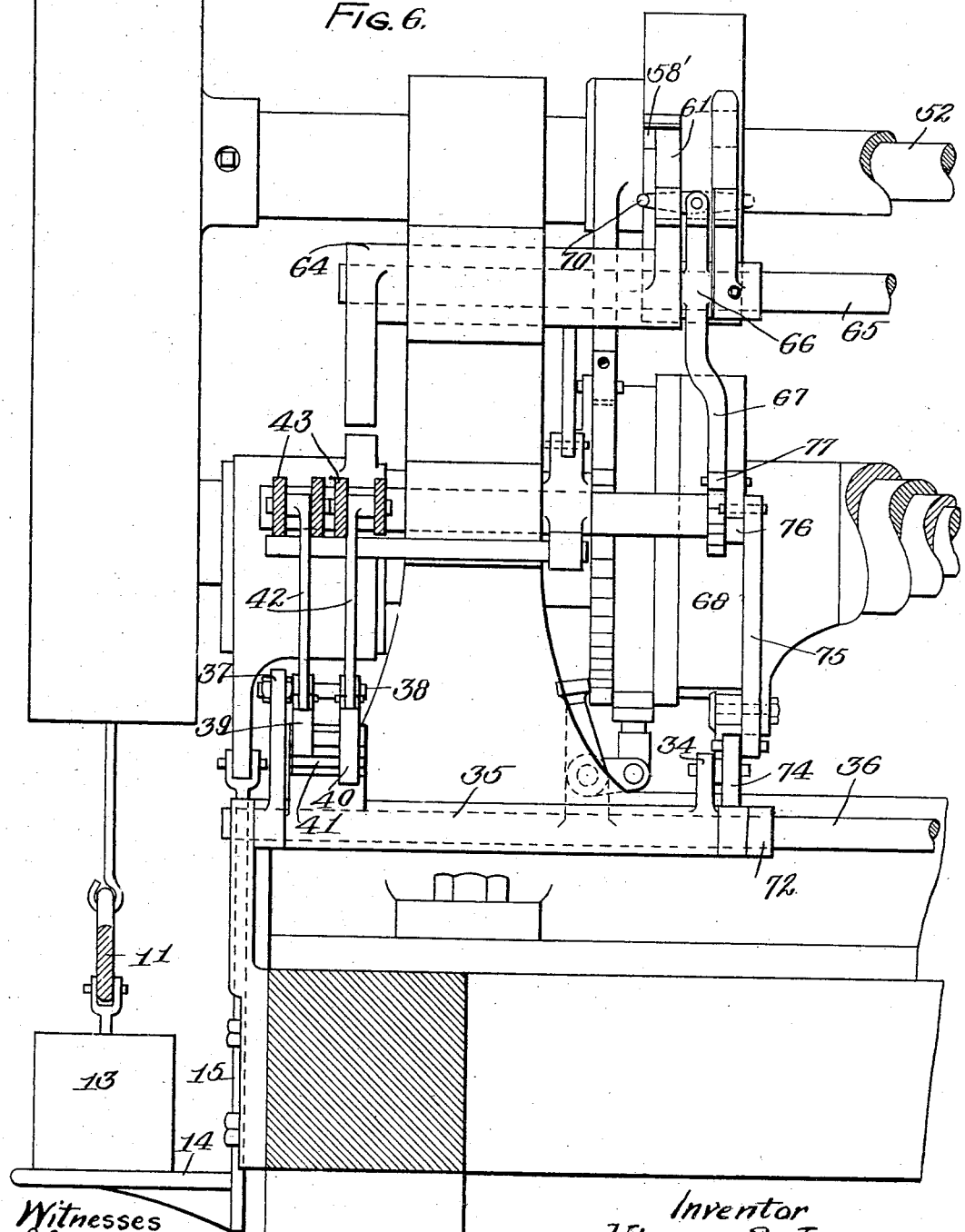
Figure 7:
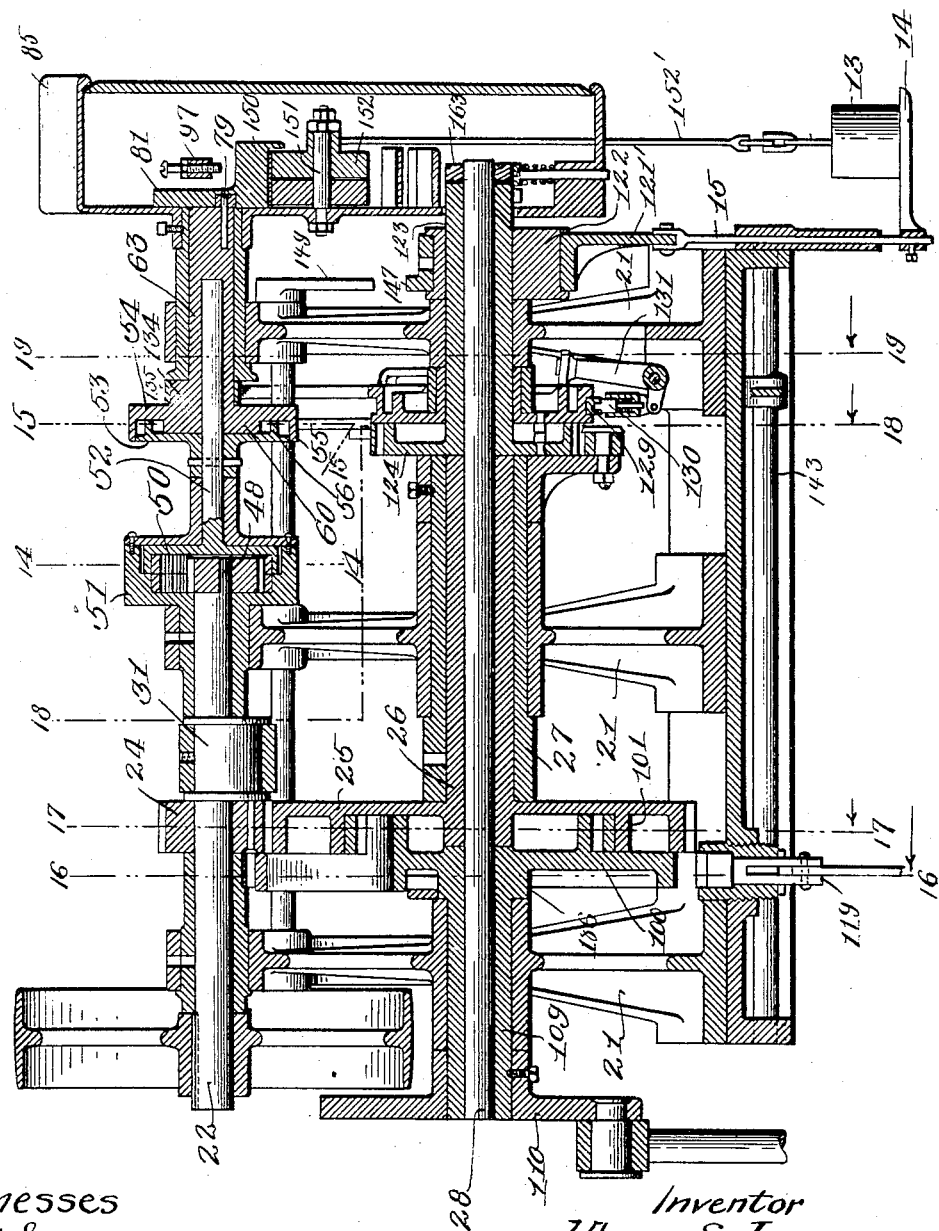
Figure 8:
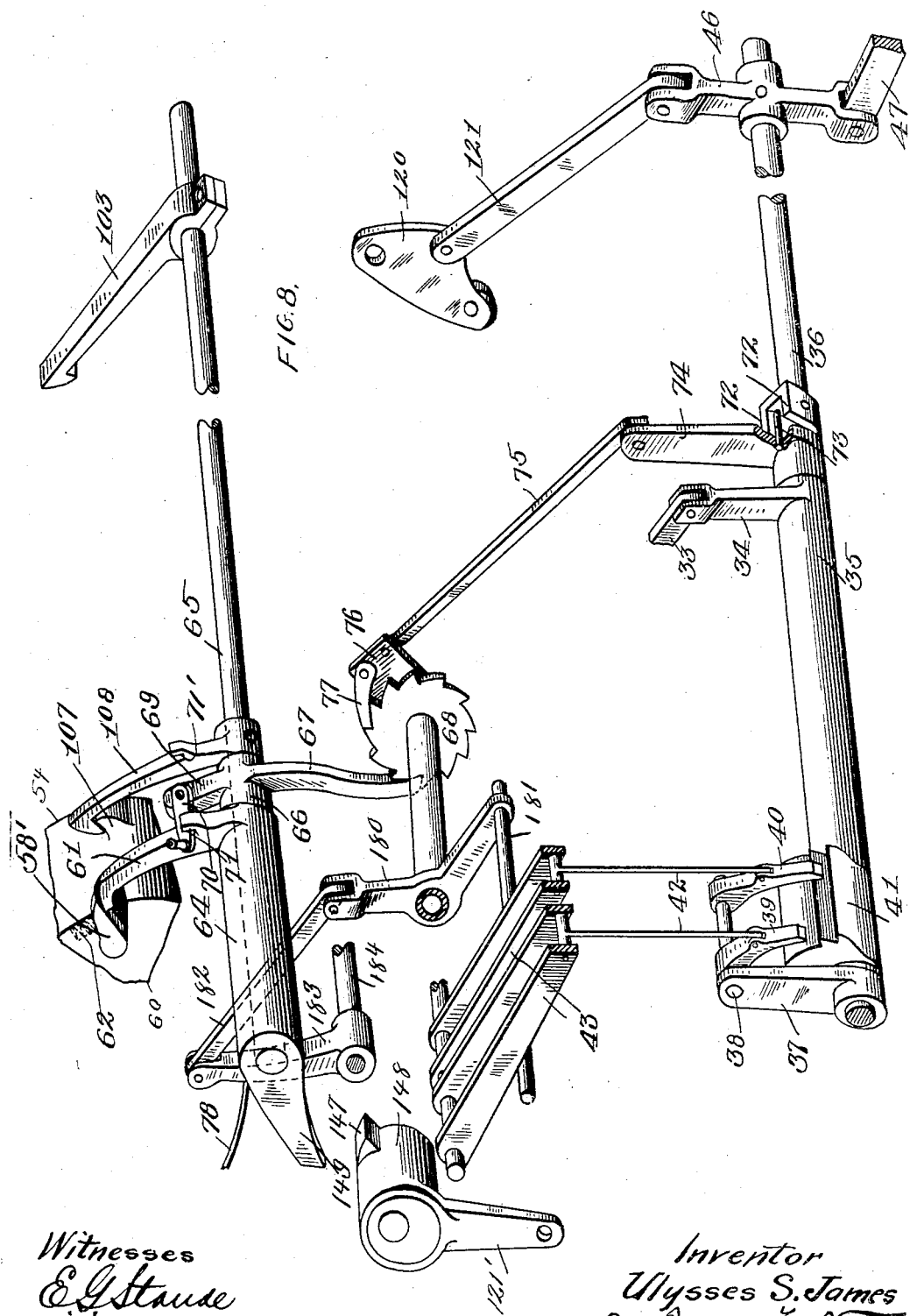
Figure 9:
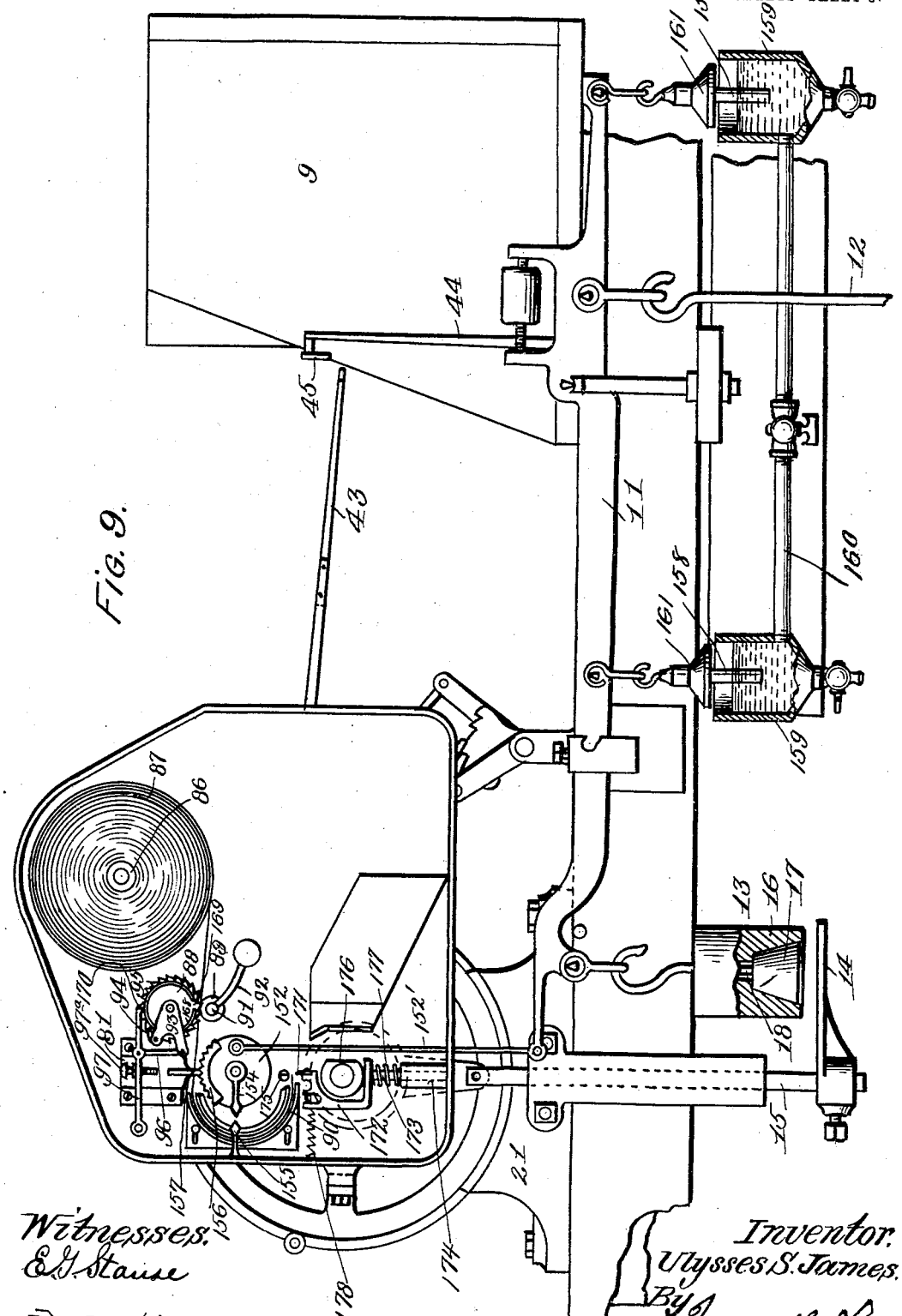
Figure 10:
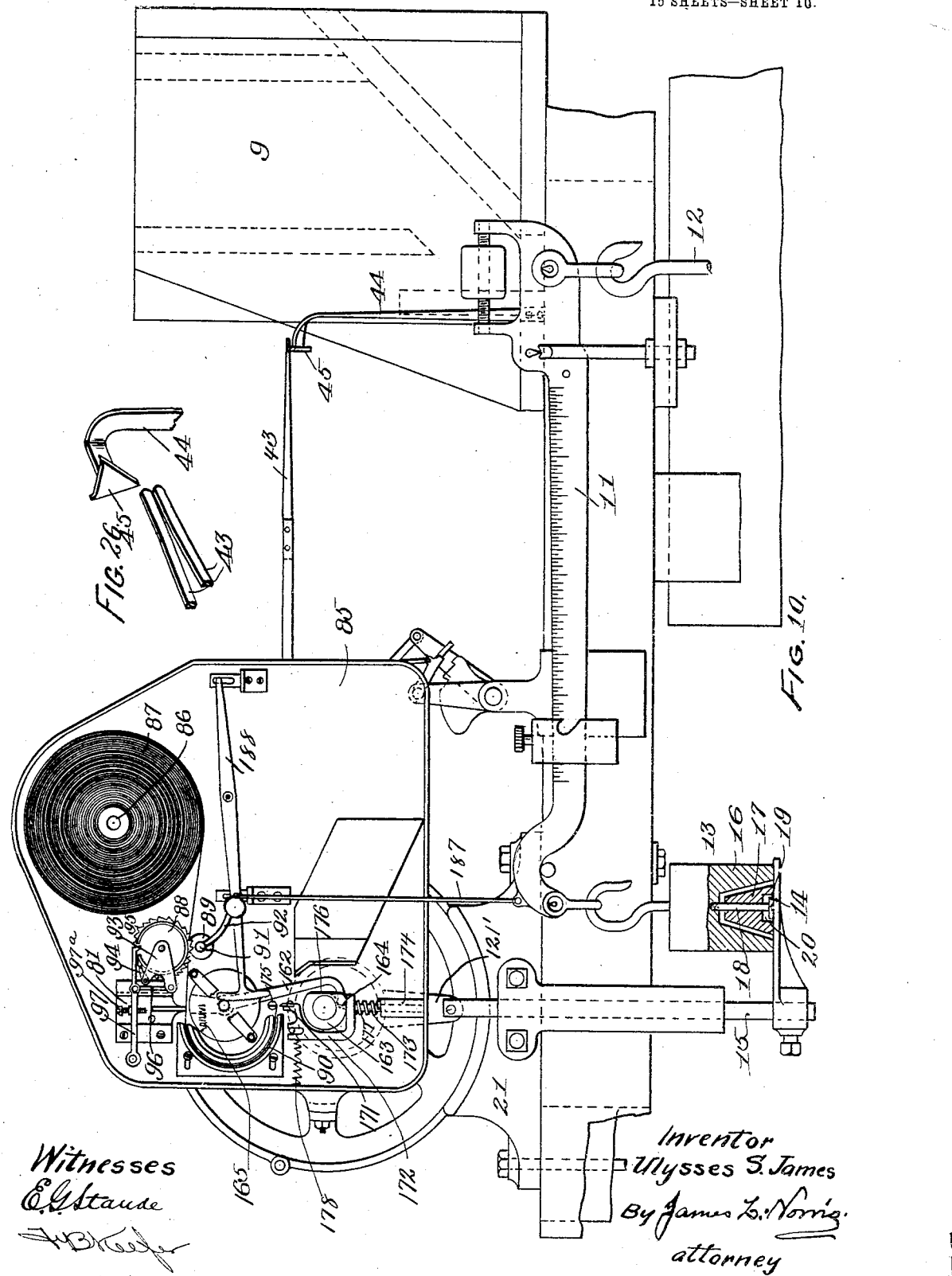
Figure 11:
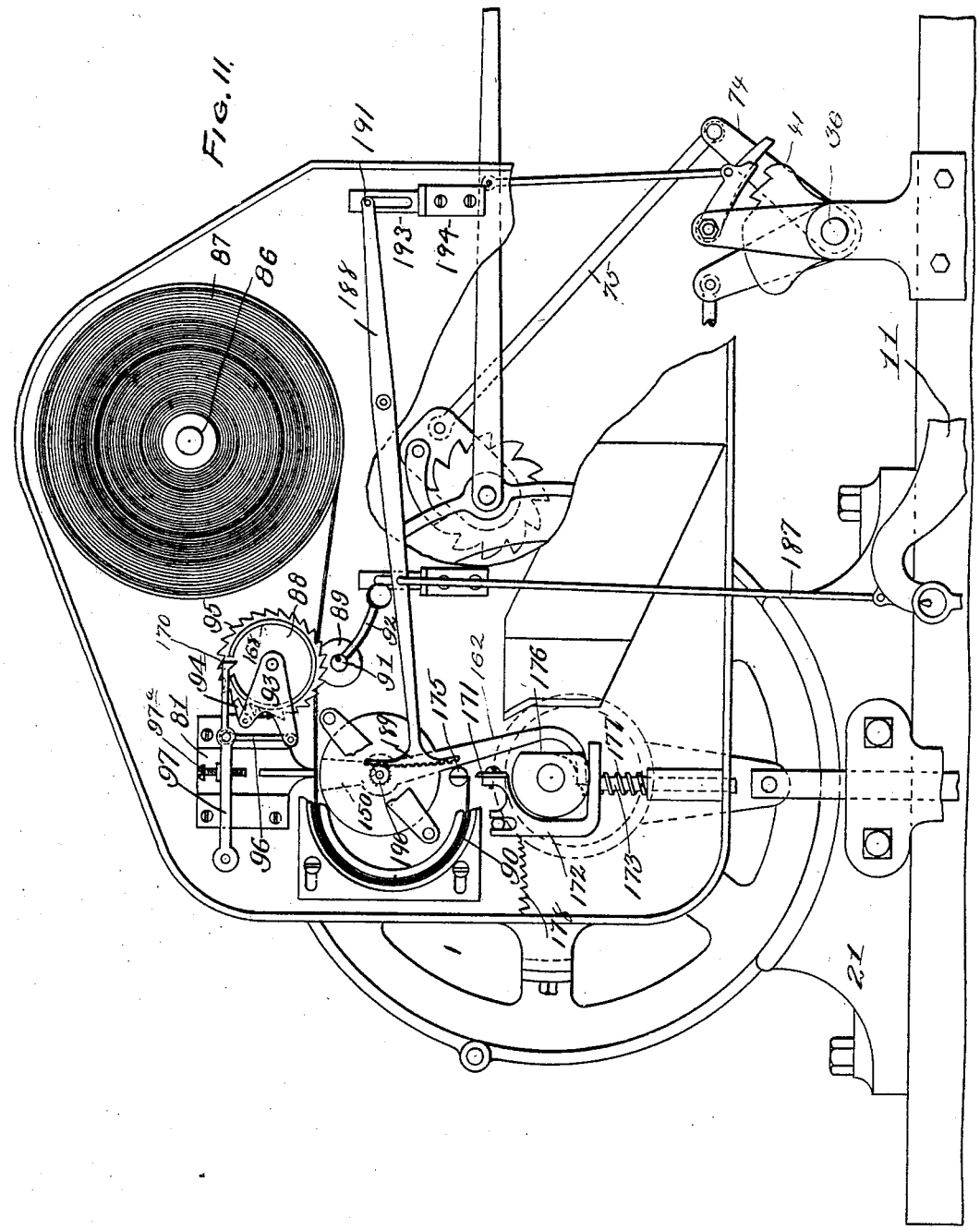
Figure 14:
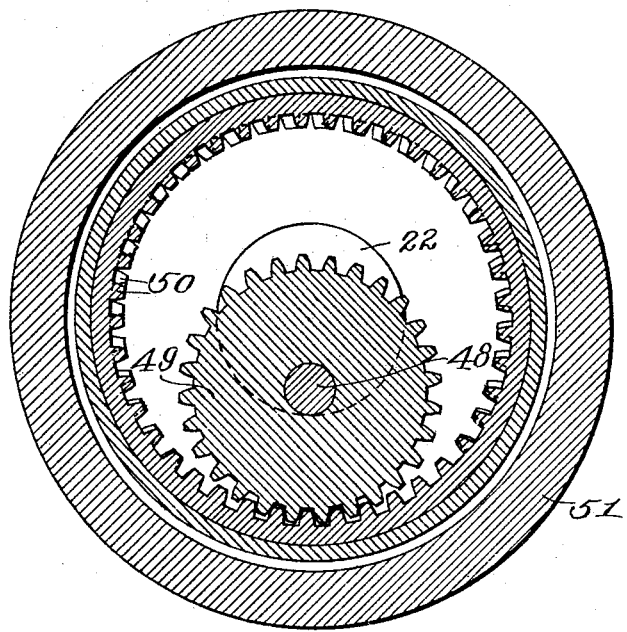
Figure 12:
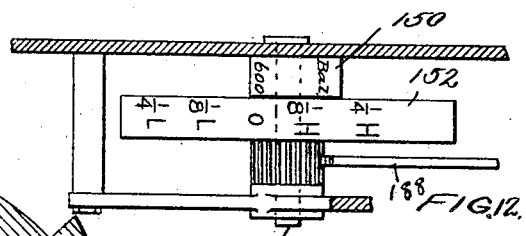
Figure 15:
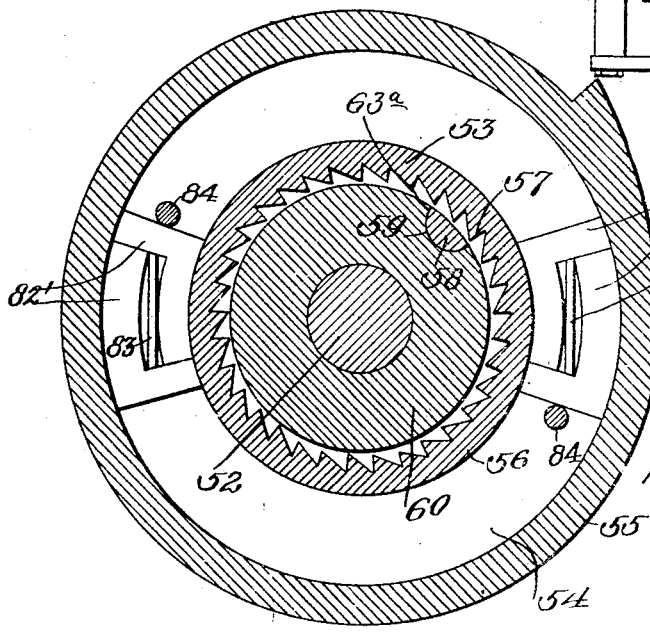
Figure 13:
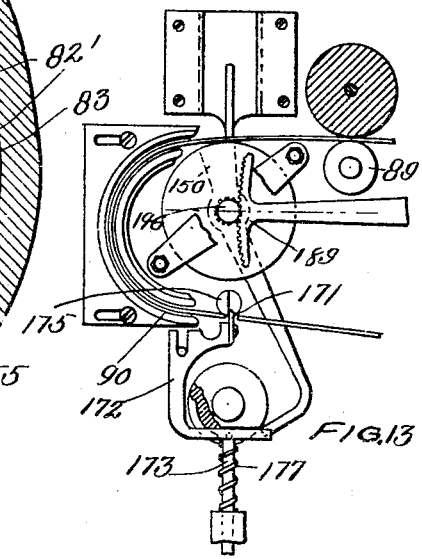

Referring to the said drawings, Figure 1 is an end elevation of the improved machine, showing the same in connection with a weighing-machine. Figs. 2 and 3 are vertical central sectional elevations of the same, Fig. 2 showing the feed and discharge controllers in position to secure the loading of the load-receiver of the weighing-machine, while Fig. 3 shows said feed and discharge controllers in the positions occupied thereby during the discharge of the load, Fig. 3 also showing the regulator into which a load is discharged down. Fig. 4 is a sectional rear elevation, the section being taken in the line 4 4, Fig. 2, and looking toward the left. Fig. 5 is a sectional plan view of the improved machine, showing also stream-supplying means and the feed-controller in connection with the latter, the section being taken in the line 5 5, Fig. 1. Fig. 6 is a sectional rear elevation, on an enlarged scale, of a part of said machine, the section being taken in the line 6 6, Fig. 1. Fig. 7 is a vertical central section as seen from the front of said machine. Fig. 8 is a perspective view, on an enlarged scale, of the shafts from which the feed and discharge controllers are operated and also showing certain controlling and actuating means therefor. Fig. 9 is an elevation of a beam shown as poised and the recording mechanism and weight-lifting means for the load-counterbalancing weight. Fig. 10 is a face view of the boxing containing the recording mechanism and a modified arrangement of supplemental poising mechanism, the beam being also shown. Fig. 11 is a similar view on an enlarged scale, a portion of the beam being omitted. Fig. 12 is a plan view of the main and auxiliary printing members and certain adjacent parts. Fig. 13 is a face view of the same. Fig. 14 is a cross-section on the line 14 14, Fig. 7, and showing speed-reducing gearing between the primary shaft and the shaft which actuates the recording mechanism. Fig. 15 is a similar view of a clutch for throwing into action the recording mechanism, the section being taken in the line 15 15, Fig. 7. Figs. 16 and 17 are similar views of the feed and discharge controller operating mechanism, the sections being taken in the lines 16 16 and 17 17, Fig. 7. Figs. 18 and 19 are sectional end elevations of part of the mechanism for lifting the weight of the beam when a test is to be made, the sections being taken, respectively, in the lines 18 18 and 19 19, Fig. 7.

Figure 27:
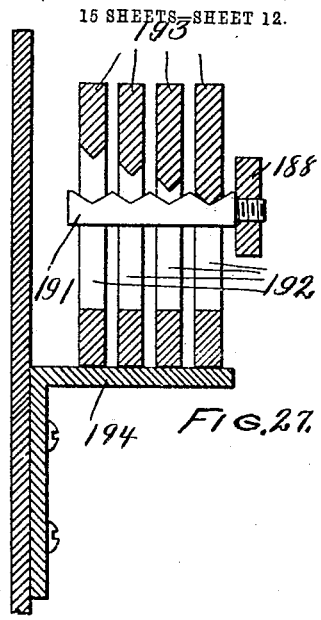

Figs. 20 and 21 are sectional views, on a larger scale, of a ratchet mechanism forming part of the weight-lifting means and the pawls for operating one of the ratchets, the section being taken in the line 19 19, Fig. 7. Figs. 22, 23, and 24 are sectional views of a ratchet and its pawl forming a part of said weight-lifting mechanism, the said pawl being shown in its three different positions, these figures also illustrating guards for governing said pawl, the section being in the line 18 18, Fig. 17. Fig. 25 is a detail in sectional elevation of the pressure member of the recording mechanism, showing also how said member is operated. Fig. 26 is a detail in perspective of a stop carried by the scale-beam and the adjacent ends of two fingers. Fig. 27 is a sectional elevation showing a portion of a modified form of supplemental poising means. Fig. 28 is a detail view of a pressure-roller and illustrates particularly the manner of mounting said roller.

Like characters refer to like parts in all the figures of the drawings.

The machine constituting the subject-matter of this application is capable of use in connection with any kind of weighing machine or scale, whether it be of large or small capacity, and for the purpose of illustrating the objects and advantages thereof I have shown it in connection with a hopper-scale of familiar construction, which I will briefly describe.

Referring to Figs. 1, 2, and 3, the numeral 2 indicates the platform of said scale, it being suitably supported by the framework 3 and being adapted to house the usual beams 4, upon which the platform 2 is sustained.

The bucket 6 is supported in some suitable manner upon the platform 2 and constitutes a suitable load-receiver forming part of the weighing mechanism, said load-receiver or bucket having a discharge-spout 7, through which the weighed charges are successively delivered, the outlet of the spout 7 being controlled by a closer or gate 8, which is of the sliding type, it being automatically moved back and forth across the outlet of said spout and being intermittently actuated from a continuously-operating power-driven member, as will hereinafter appear. Said closer or gate constitutes the discharge-controller of the weighing mechanism, as it controls the discharges from the bucket or load-carrier 6. I use the term "discharge-controller" in its broad sense to include not only a closer or gate, but any means whereby the discharge of the contents of the load-receiver or bucket is effected.

Centrally above the load-carrier or bucket 6 is arranged the feeding means for supplying the load-receiver or bucket 6 with a stream of material, which material may be, of course, any flowing kind. The feeding means in the present case consists of a supply-spout 9, the discharge-opening of which is controlled by a valve 10, which, like the closer or discharge-valve 8, is of the sliding type, said valve 10 being automatically operated from the same continuously-operating power-driven member that effects the operation of the discharge-controller or closer 8. This valve 10 I will term a "feed-controller," as it controls the feed of the material into the bucket 6, and said valve, as will hereinafter appear, has two movements from its wide-open position, the first of which cuts off the major part of the stream flowing from the spout 9 at about the time the complete load is in the load-carrier. When the load-carrier has received its complete charge, the valve is given its final movement in order to cut off the small or drip stream.

Mounted upon the framework 3 is the beam 11, which is sustained by the usual knife-edge bearing and which is connected to what I have illustrated as the right of its fulcrum, by means of the rod 12, with the bucket-supporting beams 4. Upon the extreme left of the beam 11 is supported the weight 13, that is adapted to counterbalance the load in the bucket, the weight being removable, as is customary, so that one of a different effect can be substituted therefor. This weight 13 when the beam is in its initial position with the bucket 6 empty, is supported by the weight-carrier 14, consisting of a bracket or shelf fastened to the lower end of the rod 15. This weight-carrier 14 is normally stationary, and, as will hereinafter appear, is operated so as to lift the counterbalance-weight 13 and put it out of coöperative relation with the beam, this being for the purpose of testing the accuracy of the weighing mechanism.

The load-counterbalancing weight 13 is duplex, it consisting of a main weight 16 and an auxiliary weight 17, nested within said main weight. The hooked rod 18, which connects said load-counterbalancing weight with the beam 11, extends entirely through the main weight and also loosely through the auxiliary weight, it having at its lower end a projection 19, adapted to fit within the countersink 20 in the bottom of the auxiliary weight. The main weight is adapted to counterbalance the major part or practically the entire load, it being lifted off the weight-carrier 14 when the load is nearly completed. As the stream from the spout 9 flows into the bucket 6 the bucket, of course, will descend, and when the load has been nearly completed, as just set forth, and the main weight 16 lifted the projection 19 will engage and lift the auxiliary weight 17, so as to counterbalance the remainder of the load, or that part which tops off the major quantity of said load, so that the two weights 16 and 17 when the load is completed constitute practically a unitary or single weight. When both weights 16 and 17 are lifted, the mechanism for closing the feed-controller or supply-valve is set in action, so that said feed-controller or supply-valve can be closed for cutting off the stream.

Upon the auxiliary frame 21, suitably mounted on the main frame 3, are carried the parts of my improved attachment. Upon said auxiliary frame 21 is rotatively supported the main shaft 22, from which all the parts of the attachment derive their motion and which is continuously driven in a suitable manner. For this purpose I have represented said shaft as provided with a pulley adapted to be connected by a belt with any suitable kind of motor.

Referring to Figs. 4, 7, 17, and 18, it will be seen that the continuously-operated power-driven shaft 22 carries a pinion 24, said pinion being suitably fixed to said shaft and meshing with the gear 25, rigidly connected with a sleeve or tubular shaft 26, which is surrounded by the tubular shaft 27, (see Fig. 7,) extending through a hub on the auxiliary frame, the solid shaft 28, which extends entirely across the attachment, being passed through the tubular shaft 26 and serving in practice to operate a register. (Not shown.) Upon the tubular shaft 27 is fastened in some suitable manner the rock-arm 29, to the outer end of which the rod 30 is pivoted, the opposite end of the rod being provided with a split ring which embraces the eccentric 31 on the main shaft. By reason of this connection it will be evident that when the main shaft is rotated the tubular shaft 27 will be given a continuous rocking motion. The function of the large gear 25 will be hereinafter set forth. Upon the rocking sleeve 27 is a projection 32, to which the rod 33 is pivoted, it being evident that by this construction the said rod 33 is united with the oscillating or rocking tubular shaft 27 by a crank connection. The opposite end of the rod 33 is pivotally connected with a rock-arm 34 on the sleeve 35, (see Fig. 8,) through which the rock-shaft 36 freely extends, said rock-shaft being suitably supported and carrying at what is shown as the left end the rock-arm 37, said rock-arm being fastened to the shaft 36. It will be evident that by reason of the connections described the sleeve 35 is continuously operated, and this sleeve is adapted to be coupled with the rock-shaft 36, from which the supply-valve receives it motion, by means controlled from the beam 11, as will hereinafter appear. Upon the rock-arm 37, which, it will be understood, is fixed to the shaft 36, extends laterally the pin or stud 38, constituting a pivot for the pawls 39 and 40, which coöperate with the teeth upon the ratchet 41, fixed to the rocking sleeve 35. It will be seen that the outer pawl is shorter than the inner for a purpose that will hereinafter appear. These pawls are connected by rods 42 with the bars or fingers 43, pivotally mounted at their outer ends upon the auxiliary frame and controlled by the scale-beam 11. The free ends of these bars or fingers 43 coöperate with the stop member 44 upon the beam 11.

It will be understood that the beam 11 with the buckets 6 and bucket-carrying beams 4 constitute the weighing mechanism, and while the stop that coöperates with said bars or fingers is mounted upon the beam of the weighing mechanism it is evident that this is not essential, for it may be otherwise located.

Upon what might be considered the poising side of the beam 11 or that part thereof to the right of its fulcrum is mounted the stop member 44, rising from said beam to a suitable height and having at its upper end a head 45 of triangular form, constituting a stop for governing the action of the bars or fingers 43.

With the bucket 6 empty the free ends of the bars or fingers 43 will be resting upon the upper horizontal edge of the triangular head or stop 45, thereby holding the pawls 39 and 40 out of engagement with the continuously-operating segmental ratchet 41.

When the major part of the load of material is in the bucket 6, the same will descend, thereby swinging the vertical stop member 44 toward the right, and at about the time the complete load is in the load-receiver the head or stop 45 will be carried free of the outer bar or finger 43, which outer bar, it will be seen on reference to Fig. 5, is shorter than the inner or companion bar or finger. This of course releases said bar or finger, so that by its own weight can drop, thereby carrying the short pawl 39 into engagement with the segmental ratchet 41, so as to, in effect, rigidly connect the ratchet and the rock-arm 27, whereby said rock-arm, and consequently the shaft 36, which rigidly carries the same, will be operated, the ratcheting of pawl continuing until the free end of the pawl is brought into contact with the plain face of said ratchet.

Upon the end of the shaft 36 opposite that carrying the rock-arm 37 is rigidly fastened a rocker 46, having oppositely-disposed arms, the downwardly-extending one of which is connected by the rod 47 with the feed-controller or supply-valve 10. When, therefore, the shaft 36 is operated through the pawl-and-ratchet mechanism just set forth, the lower arm of the rocker 46 is swung toward the right in Fig. 3, so as to partially and practically completely close the valve 10. With the valve partially closed a fine stream can flow from the supply-spout 9 into the bucket, and when the load is fully completed the stop 45 will be carried free of the inner or long bar or finger 43, so as to release said bar or finger and permit it to drop, and thereby carry the pawl 40 into engagement with the ratchet 41, it being seen that said ratchet is equipped with two teeth, and the pawl will be ratcheted toward what is shown as the left in Fig. 9 to thereby further operate the rock-shaft 36 in the manner before described and fully close the valve 10, this operation taking place at the time the complete load is in the bucket. As the pawls 39 and 40 are of different lengths, the period of ratcheting operation of the pawl 39 is longer than that of the pawl 40, so that when the pawl 39 is under operation the valve 10, through the intermediate mechanism, can be practically closed, being fully closed through the action of the pawl 40 in the manner described. After the feed-controller or supply-valve 10 is fully closed mechanism is brought into operation for recording the load, and after this takes place the fingers or bars are returned to their initial position, and the means for securing these results will be hereinafter set forth.

The inner end of the main shaft 22 (see Fig. 7) is provided with a crank-pin 48, extending freely through a central opening in the pinion 49, the teeth of said pinion being adapted to mesh with the internal teeth of the ring-gears 50, inclosed by the boxing 51, the gear on the left having one tooth less than the other one and being rigid with said boxing, while the gear on the right is rigid with the shaft 52, so that as the pinion rides over said internal teeth the gear 50 on the right will be rotated at a less speed than the shaft 22, said train of gears constituting a convenient means for securing a reduction in speed of shaft 52, from which the recording mechanism is operated, with respect to the main shaft 22. The pinion and gears, together with the eccentric or crank-pin 48 upon the main shaft, are also clearly shown in Fig. 14. The shaft 52 fixedly carries one member, 53, of a clutch, the other member, 54, of said clutch being loose on said shaft. Extending inwardly from the loose clutch member 54, at the outer edge thereof, is an annular flange 55, while the fixed clutch member has an annular flange 56, surrounded by the first-mentioned flange, the two, however, being separated, as shown in Figs. 7 and 15. The innermost annular flange 56 has upon the inner surface thereof the ratchet-teeth 57, adapted to be engaged by the point or working end of a pawl 58, the inner side of the pawl being fitted in and shaped to agree with a pocket or seat 59 of semicircular form in the periphery of the hub 60 of the loose clutch member. The outer surface of the pawl 58, it will be seen upon reference to Fig. 15, is curved upon an arc to agree with the periphery of said hub, the curved outer surface of the pawl being normally in the same plane as that of the periphery of the said hub, in which position it is held by the detent 61, (see Fig. 8,) which detent is adapted to engage the arm or extension 58' of said pawl, the arm having a movement relatively to the other parts of the clutch in a slot or aperture therein.

At the time the load is fully made up the detent 61, as will hereinafter appear, is lifted out of engagement with the free end of the arm or extension 58', thereby freeing said arm, so that a spring 62, bearing against said arm, can rock the pawl in its bearing or seat and move the point 63ª thereof into engagement with the teeth 57. When the pawl is thus operated by the spring, it will be evident that the clutch-halves 53 and 54 are coupled. The shaft 63 extends laterally from the loose clutch-half 54 and is socketed or made partially hollow, as seen on reference to Fig. 7, to receive the shaft 52, the pressure member of recording mechanism hereinafter more particularly described being operated from the shaft 63. The detent 61 extends from an elongated sleeve 64, loose on shaft 65, which extends across the rear of the attachment. The shaft 65 also loosely carries the sleeve 66, from which the pawl 67 depends, said pawl being operable by the ratchet 68 upon the stud or pivot which carries the bars or fingers 43. An arm 69 extends upward from the sleeve 66 and is normally coupled to the detent 61 by means of a coupling device 70, consisting of an arm pivoted to said arm 69 and the free end of which is adapted to fit in a notch 71 of the detent 61, as shown in Fig. 8. When the coupling is in the position indicated, the arm 69 and detent 61 are united, so as to constitute, in effect, a single member, by reason of which when the pawl 67 is operated by the ratchet the detent 61 will be also operated.

By moving the coupling device 70 out of the notch 71 and setting it in a similar notch 71' in the arm 108, hereinafter more particularly described, the pawl 67 is disconnected from the detent 61, so that after a load is made up the same will not be recorded. This is for the purpose of weighing the loads without obtaining a record of the same in case such result should be desired.

Upon the shaft 36 are the projections 72, which are adapted to coöperate with the pin 73, extending laterally from the rock-arm 74, loose on said shaft 36, the upper end of said arm 74 being connected by a link 75 with the plate or pawl-carrier 76, loose on the stud which carries the ratchet 68, said plate 76 pivotally supporting the gravity-pawl 77, which coöperates with the ratchet 68. At the commencement of operation, as shown in Fig. 8, the farthermost projection 72 will be in contact with the pin 73. When the segmental ratchet 41 operates the pawl 39 in the manner hereinbefore described, the shaft 36 will be moved a distance sufficient to carry the projection 72 nearest to view into contact with the pin 73, the valve 10 during this period having been practically entirely closed. The arm 74, of course, has not been operated. When, however, the pawl 40 is operated in the manner hereinbefore described to cause the final movement of the valve, the last-mentioned projection 72 will engage the pin 73 and swing the arm 74, thereby through said arm imparting a thrust to the link 75, and consequently to the pawl 77, for rotating the ratchet 68 a distance of one tooth, so that the cam-shaped tooth of said ratchet can swing the pawl 77 outward, and hence move the working end of the detent 61 away from the arm 58', thereby releasing the pawl 58, whereby the spring 62, acting against the arm 58' of said pawl, can move the point of the latter into engagement with the teeth 57. When this last-mentioned result occurs, the clutch members 53 and 54 are connected so that the shaft 63 will be rotated. It will be understood that the pawl 67 upon each motion of the ratchet 68 is moved a distance equaling only one tooth, so that after it has been thus operated the detent 61 will be returned to its initial position in order to engage the extension 58' of the pawl, and thereby move the tooth of the pawl out of its effective position, this operation occurring after the recording of the load. The detent 61 is held normally in its effective position by means of a spring 78, connected therewith and bearing against some relatively fixed part of the device.

Upon the outer end of the intermittently-operative shaft 63 is the crank-pin 79, carrying the antifriction-roller, serving its usual function and playing in the transverse slot 80 in the vertically-movable block 81, which constitute the compression member of the recording mechanism, the lower face of said compression member or block 81 being flat, as at 82, and constituting a printing-face against which impressions are made by printing members, also forming a part of the recording mechanism, a strip or ribbon of paper being adapted to pass between the printing and compression members. When the compression member of the recording device is lowered, it causes by its pressure upon the printing member an imprint to be made upon the ribbon or strip. It will be understood that normally the compression member is elevated above the printing member, the crank-pin 79 being at this time about midway of the slot 80. When the shaft 63 is given a single rotation through the agency of the one-revolution clutch hereinbefore described, the crank-pin will be caused to ride to one end of the slot and then to the opposite end and then to its primary position, and during this period the block will have been lowered from its topmost to its lowermost position and then returned to its topmost position. At the moment that the compression member or block 81 reaches its uppermost position the arm or extension 58' of the pawl 58 will be thrust out of its operative position by the action of the detent 61, after which the load can be discharged, as will hereinafter appear. In the space between the flanges 56 and 55 are the pairs of substantially L-shaped strips 82' of leather, wood, or other suitable material, capable of securing the proper frictional grip upon the adjacent faces of said flanges and so arranged as to form a slot between them in which springs 83 are respectively located, the springs forcing the respective strips away from each other and into contact with said flanges. These strips 82' are carried around with the movable clutch member 53 by the pins 84 on said clutch member, and it will be evident that the springs 83 by acting against the clutch members will at the moment the pawl 58 is disengaged from the teeth 57, which occurs when the free end of the arm or extension 58' strikes the detent 61, prevent any rearward or retractive movement of the loose clutch-half 54 relatively to its companion, so that the said arm or extension is held against rattling during the operation of the clutch-half 53. Within the casing or boxing 85 upon one end of the auxiliary frame 21 are situated the compression and printing members of the recording mechanism. A spool or reel 86 is rotative in said casing and carries a roll 87 of paper in narrow or ribbon form, the ribbon of paper extending from the spool 86 through the rollers 88 and 89 and also through a guide-channel 90 of curvalinear form, Fig. 9, partially surrounding the printing devices.

The upper roller 88 is in the nature of a feeding device for the tape or ribbon of paper, it being given a step-by-step movement, as will hereinafter appear, while the lower roller 89 holds the web in proper contact with the feeding-roller, so as to secure the movement of the paper. The lower roller is carried upon an eccentrically-mounted pin 91, from which rigidly extends the weighted arm 92. By lifting the weight of said arm 92 the ribbon of paper can be passed between the two rolls, and when this is done the weight is lowered so as to move the pressure-roll 89 into proper contact with the paper. In Fig. 28 I have shown clearly the manner in which said lower roller is mounted, the bracket which supports said roller and its companion roller being omitted from Figs. 9, 10, and 11 for clearness. The leading end of the paper is then introduced into the mouth of the channel and fed forward by hand or otherwise and thereafter receives the impressions of the recording mechanism. The paper strip is advanced automatically step by step, and I will now set forth a mechanism for securing this result.

Upon the spindle or arbor of the roller 88 is loosely carried a bifurcated arm 93, one branch of which carries a pivoted gravitative pawl 94, adapted to engage the teeth of the ratchet 95 upon the adjacent end of the feed-roller 88, while the other branch of the bifurcation is connected by the link 96 with the lever 97, substantially intermediate its ends, said lever being fulcrumed upon a stud in the boxing or casing 85. The lever 97 is connected by means of the set-screw 97$^a$ with the block 81. It will be evident that when the compression member or block 81 of the recording device is lifted it will move the lever 97 in a corresponding direction, the same result following with respect to the bifurcated arm 93, so that the pawl 94 can engage the ratchet 95 and feed the same one tooth, the feed motion being completed when the compression-block member reaches the limit of its upward movement. Upon the shaft 28 and fixedly secured thereto in some convenient manner and arranged in proximity to the continuously-operative gear 25 is a disk 100, constituting one section of a clutch, the other section thereof forming a part of the gear itself. Upon the inside of the gear 25 is an annular flange 101, having teeth upon its inner side adapted to be engaged by a pawl 102, carried for rocking movement by the disk 100, the pawl being normally held in its ineffective position by a detent 103, engaging the radial arm or extension 104 of said pawl, as shown in Fig. 18. The said detent is carried by the rock-shaft 65, hereinbefore described, and is held in effective position by means of a spring 105, connected therewith, and its free end bearing against a relatively fixed part of the machine. The instant that the detent 103 is disengaged from the arm 104 the spring-actuated plunger 106, bearing against the extension or arm 104, can move the pawl 102 into its effective position for coupling the disk 100 to the gear 25, so that said disk will be rotated. I have not described in detail the mounting and construction of the pawl 102, for as to these features it is exactly like the pawl 58, hereinbefore described. Upon the loose clutch member 54 is a cam 107, adapted at the instant the record of the load has been printed to engage and lift the arm 108, fastened to the shaft 65, so that said shaft can be rocked to lift the detent 103, it being remembered that said detent 103 is fixed to the shaft 65. As soon as the cam 107 passes clear of the arm 108 the spring 105 returns the detent 103 to its normal position.

Referring to Fig. 7, it will be seen that the disk 100 is provided with a tubular shaft 109, through which the shaft 28 passes, the two shafts being connected in some suitable manner, and the cam 110 is pinned or otherwise fastened to the tubular shaft. To the crank-pin 111 on the cam 110 is united the connecting-rod 112, (see Fig. 2,) the lower end of said rod being jointed to one arm of the angle-lever or bell-crank 113, the other arm of the bell-crank being united loosely with the extension 114 of the closer or discharge-valve 8. When the disk 100 is coupled to the gear 25 in the manner before described, the disk of course will be caused to rotate, thereby carrying the cam 110 in the corresponding direction, so that through the agency of the crank-pin 111 the connecting-rod 112 is thrust downwardly, consequently rocking the angle-lever 113 and sliding the closer or discharge-valve 8 open. The loose joint between the angle-lever and closer, or rather the extension 114 of said closer, permits the perfect poising of the weighing mechanism without hindrance from the angle-lever 113 and the parts connected therewith, they being entirely separated, so that accurate weighing is assured. Upon the upper side of the main frame 3 is pivotally supported a substantially Y-shaped lever 115, the branches of which are connected by the rods 116 with the regulator 117, situated below the discharge-orifice of the bucket 6 and into which the loads are successively discharged to thereby depress or lower said rocker. With the single arm of the Y-shaped lever 116 is connected the weight 118, which weight and the arm carried thereby are of course elevated upon the depression of the regulator 117. When practically the entire load has passed through the regulator 117, the weight 118 is free to drop, so that through the intermediate parts the regulator can be returned to its primary position.

To the extreme outer end of the lever 115 is pivoted the lower end of a sliding bolt 119, the upper end or head of which is thrust by the depression of the regulator, acting through the intermediate parts, upward into position to be engaged by the extension 104 of the pawl 102, so as to thereby disconnect the pawl from the teeth of the flange 101 and arrest the motion of the disk 100 and hold the closer 8 wide open in order to effect the complete discharge of the bucket 6. When the contents of the bucket have been completely emptied therefrom and when such contents have passed from the regulator 117, the weight 118 is free to drop and as it does so it pulls, through the lever 115, the bolt 119 down, releasing the pawl 102, so that the latter can be again thrust into engagement with the teeth of the flange 101 to couple the disk 100 and continuously-operating gear 25. In Fig. 3 the bolt 119 is shown as occupying its effective position, and as soon as it passes clear of the extension 104 the disk and gear mentioned can be coupled to effect the rotation of the cam 110, and consequently elevate the connecting-rod 112 from the position shown in Fig. 2 to that represented in Fig. 3, the closer 8 during this action of the connecting-rod being moved into its fully-closed position. When the closer is fully shut, the free end of the extension will strike the shoulder of the detent 103, so as to disconnect the disk 100 and gear 25. Upon a stud on the framing 21 is supported the rocker 120, to which the link 121 is pivoted, said link being likewise united to the upper arm of the rocker 46, which, it will be remembered, is connected with the supply-valve 10.

Just at the time the closer reaches its shut position the working surface of the cam 110 is adapted to engage the rocker 120 or an antifriction-roller carried thereby and to swing said rocker about its axis toward the right, (see Fig. 3,) thereby thrusting the link 121 in a corresponding direction and moving the valve 10 through the intermediate parts to its open position, as indicated in Fig. 2, the effective portion of the cam passing off the antifriction-roller of the rocker just at the moment the valve is opened wide to permit the full stream to flow into the empty bucket 6. From the preceding description it will be evident that as soon as a load is made up and the supply-stream is cut off a printed record is made of said load, and after the desired number of loads have been discharged the load-counterbalance is thrown out of coöperative relation with the weighing mechanism and the latter automatically tested to indicate whether the machine is weighing heavy or light, and if these facts are shown the difficulty can be discovered and remedied.

In the present case I employ a weight as a load-counterbalance; but this, of course, is not essential, and it will be remembered that the weight may have a movement relatively to the beam carrying the same, said weight being automatically lifted periodically for the purpose set forth. The load-counterbalancing weight 13 is normally sustained by the weight-carrier 14, mounted for rising-and-falling movement and connecting with a suitably-guided rod 15, said rod being suitably jointed at its upper end to a connecting-rod 121', (see Fig. 9,) provided at its upper end with a split ring embracing the eccentric 122, (see Fig. 7,) fixed to the tubular shaft 123, extending laterally from the ratchet 124, the shaft 28, hereinbefore mentioned, extending through said tubular shaft 123. Arranged at the side of the ratchet 124 is a second ratchet 125 or what might be considered a mutilated ratchet, as it has a series of teeth and a single tooth upon its periphery, said periphery between the series and single tooth being plain or smooth. The mutilated ratchet 125 is provided with an inwardly-extending elongated segmental flange 126, constituting a main guard, and a short segmental projection 127, constituting an auxiliary guard, the two guards being adapted normally to hold the pawl 128, which operates the main ratchet, out of coöperative relation with said ratchet. The weight-lifting mechanism is operated from these ratchets, and by reason of the guards just set forth the weight-lifting mechanism is normally held inactive, the ratchet 125, however, being operated at predetermined points so as to move the guards successively out of their effective positions to thereby permit the operation of the ratchet 124 by its pawl 128. The pawl 128 is continuously operated, it being connected pivotally at its lower end with the projection 32 on the rocking sleeve or tubular shaft 27.

To prevent retractive movement of the mutilated ratchet 125, I provide a friction brake device now to be described. Said friction brake device includes in its construction a shoe 129, (see Fig. 7,) connected with one end of a spring-actuated plunger 130, the spring of the plunger serving to normally hold the brake-shoe in proper contact with the bottom of the peripheral groove in the mutilated ratchet 125, said groove being situated between the two guards 126 and 127 and the mutilated-ratchet portion of said ratchet. The spring-actuated plunger is connected with one arm of an angle-lever 131, a second arm of said angle-lever being in position to be operated by a cam 132 on the mutilated ratchet 125, (see Fig. 19,) said angle-lever also having a third arm 133, constituting a locking device, which engages a pawl hereinafter described to prevent for the time being, through intermediate mechanism, the opening of the supply-controlling valve. This occurs during the testing operation. On the shaft 63 of the clutch member 54 (see Figs. 7 and 18) is an eccentric 134, embraced by the ring of the connecting-rod 135, connected at its lower end with the arm 136, pivoted to a ring 137, surrounding the tubular shaft or hub of the mutilated ratchet 125. The connecting-rod 135 pivotally carries at its lower end the pawl 138, adapted to coöperate with the teeth of the mutilated ratchet, the pawl being held in its effective position by a spring. It will be understood that each time a record is made of a load the clutch member 54 is given a complete rotation, the pawl 138 at this time being operated a distance sufficient to rotate the mutilated ratchet to an extent equaling one tooth thereof. At the commencement of operation the point of the pawl 138 will be in contact with the plain portion of the mutilated ratchet, as shown in Fig. 21. When the clutch member 54 is rotated in the direction of the arrow in the said Fig. 21, the pawl 138 is lowered into engagement with the first of series of teeth in the mutilated ratchet and is then raised, so as to move said ratchet the distance just stated. These operations occur progressively after each record is made or until all of the series of teeth have been operated by said pawl 138. This brings the plain portion of the periphery of the said mutilated ratchet into position to be engaged by said pawl and also brings the initial tooth of said series into position to be operated by the pawl 139, held in its working position by means of a spring and pivotally mounted upon the arm 140, extending radially from the ring 137, said arm 140 being connected by a link 141 with the arm 142, fastened to the rock-shaft 143, said rock-shaft having at or near its opposite end a short arm 144, (see Figs. 2 and 3,) pivotally connected (see Fig. 18) with the shank of the locking-bolt 119. It will be evident, therefore, that the pawl 139 is connected with the regulator 117, said pawl being normally given an effective movement by the dropping of the weight 118, which, it will be remembered, is elevated upon the depression of the regulator 117—that is to say, when the regulator is empty, or practically so, the weight is permitted to drop, and it serves, through the intermediate connection, to impart a working stroke to the pawl 139.

After the last one of a given number of loads has been discharged from the bucket, which number of loads in the present case is twenty, it being seen that the series of teeth of the mutilated ratchet is twenty in number, the regulator 117 is of course lowered, and the weight, through the intermediate connections, elevates the pawl 139 from the position shown in Fig. 21 to that shown in Fig. 20, it being understood that at this time the bucket is empty. Just prior to this operation what is shown as the upper end of the main guard 126 is in position to prevent the continuously-operating pawl 128 from engaging the teeth of the ratchet 124, as shown in Fig. 22. When empty or partially empty, the regulator 117 rises by the falling of the weight 118. The pawl 139 engages the leading tooth of the series of the mutilated ratchet, and thereby advances the same one tooth, so as to carry the main guard 126 free of the point of the continuously-operating pawl 128, whereby said pawl can engage the ratchet 124 and rotate the same. The eccentric 122 will be also rotated, so as to elevate, through the intermediate connecting-rod 121, the bar 15 for lifting the bracket 14, and thereby the load-counterbalance, so that the test can be made, a record being taken of the test while the weight is lifted from the beam. When the test is concluded, the weight will be automatically lowered to its initial position, as will hereinafter appear.

Upon the inner and adjacent faces of the ratchets 124 and 125 are the pins 145 and 146, having flat faces adapted to engage each other, said flat faces when put into engagement automatically, as shown in Fig. 24, virtually coupling the two ratchets, so that they constitute, in effect, a single member. During the weight-lifting operation the ratchet 124 is operated by the continuously-moving pawl 128 to carry the flat face of the pin 145 toward and in contact with the corresponding face of the pin 146, so that the two ratchets can be coupled and operated as one by the action of the pawl 128. As the mutilated ratchet 125 turns it brings the projection or guard 127 into the path of the point of the pawl 128, thereby momentarily arresting the action of the pawl 128, the weight 13 at this point being fully elevated. At this point a cam 147 (see Fig. 8) on the ring 148 of the connecting-rod 121' engages the arm 149 on the sleeve which carries the detent 61, thereby disengaging the said detent from the extension 58' of the pawl 58, by reason of which the clutch-sections 54 and 53 can be automatically coupled to throw the recording mechanism into action. When the recording mechanism is thrown into action, (the load-counterbalancing weight 13 being lifted,) a test is made and a record secured of the test to show whether the weighing mechanism is in poise or balance.

It will be remembered that when the regulator 117 is lowered it causes, through intermediate connections, the opening of the supply-valve 10; but when a test is to be made it is essential to lock the regulator against elevation by the dropping of the weight 118. During the normal operation of the mutilated ratchet 125 the cam 132 upon the outer face of said ratchet is riding against the intermediate arm of the angle-lever 131, so as to hold the locking-arm 133 of said angle-lever in its ineffective position. When, however, the working portion of the cam passes free of said intermediate arm, the same, and consequently the locking-arm 133, will be released, so that said locking-arm is automatically thrown under the pawl-carrying arm 130, as indicated in Fig. 23, by the power of the spring of the spring-actuated plunger 130. The parts are so proportioned that the weight 118 is permitted to have a slight descending movement to bring the pawl-carrying arm firmly against said locking-arm, but not sufficient to release the locking-bolt 119. In case the locking-bolt 119 should be released while a test is being made the supply-stream would be caused to flow into the empty bucket, which must be prevented while making the test and record thereof.

It will be remembered that I have hereinbefore described a vertically-reciprocatory compression-block constituting part of the recording mechanism, and this compression-block coöperates with the printing member 150, pivotally mounted upon a stud 151 in the boxing or casing 85, the body of the printing member 150 being in the form of a segment and it bearing upon its upper curved face type showing the weight of the charge and the abbreviation "Bal." Normally the member indicating the weight is in vertical alinement with the printing-surface of the pressure-block 81, so that when the said block is lowered it presses the ribbon of paper against the printing member to receive on said paper an impression indicating the weight of the charge in the bucket. It will be understood that the block is reciprocated after the completion of each charge in the bucket 6. The printing member 150 is in the nature of the main one, an auxiliary printing member being provided to indicate fractions of a pound, the auxiliary member being shown as a wheel 152, bearing upon its periphery at the opposite sides of a zero-mark marks indicating fractions of a pound, the fractional marks at the opposite sides of the zero-mark being followed by the letters "H" and "L," respectively, to indicate whether the load is over or under weight. This auxiliary printing member, which is rotatively mounted upon the pin 151', extending from the stud 151, is also employed in making a test to indicate the condition of the scale. The printing-wheel has eccentrically connected therewith the link 152', united in the same convenient manner with the counterpoising end of the beam 11, from which it will be understood that the said auxiliary printing member or wheel is advanced as said counterpoising side of the beam rises and falls. The auxiliary-printing member or wheel 152 has connected with its hub the pointer or finger 154, which when an absolutely-accurate load is in the bucket is brought opposite an index or projection 155, suitably fixed inside the casing. When the weighing mechanism is accurately poised, the zero-mark on the printing member or wheel 152 will be impressed upon the tape or ribbon of paper unwound from the roll 87 by the action of the pressure-block 81. If the weight in the bucket be under the predetermined amount, the pointer 154 will not be carried around to the index 155, the result being that one or the other of the fractional marks upon the periphery of the auxiliary printing member is brought opposite the printing-point, so that when the record is made the fractional mark will be indicated upon the ribbon, followed by the letter "L."

If the load in the bucket 6 be overweight, the pointer 154 will be carried beyond the index, so that the fractional impression can be made upon the ribbon of paper, followed by the letter "H." To the hub of the auxiliary printing member is connected the body of a toothed segment 156, the teeth extending a short distance outward beyond the periphery of said printing member, so that the beveled portion or tooth 157 at the lower end of the compression member can be thrust between two of the teeth of said segment to hold the same, and consequently the auxiliary printing member, against oscillation when the imprint therefrom is to be made. When the compression-block 81 is lifted, the beveled portion or tooth 157 is disengaged from the segment 156, so as to release the said auxiliary printing member. During the normal operation of the machine the ribbon or tape of paper from the roll 87 is fed step by step in the manner hereinbefore described, so as to bring fresh portions of the paper into position to receive successive marks thereon. When the weight is lifted, it is for the purpose of making a test to indicate the condition of the weighing mechanism, and the auxiliary printing member 152 performs an important function in this connection. During this time it will be understood that the bucket 6 is empty. From the opposite sides of the center of the beam are suspended the plungers 158, the lower ends of which are immersed in fluid in the cups 159, supported by the framework of the machine and in communication with each other by means of the tube 160, said plungers being freely fitted in their cups. In the present instance the fluid employed is mercury, the plungers being held immersed therein by means of the weights 161, connected with the respective plungers. When the beam 11 is at a true poise, it will occupy a horizontal position and the plungers 159, which are in the nature of supplementary poising devices, will be exactly counterbalanced. Should there be an excess of weight applied to the poising side of the beam, or that part thereof to the right of its center of its oscillation, said poising side will be drawn below the horizontal line, the counterposing side of the beam being lifted above said line. The result therefore is that the plunger 158 on the right is forced down deeper into the mercury in the corresponding cup, the other plunger being lifted in the mercury. As the plunger on the right sinks into the mercury it meets gradually an increased resistance. While the plunger on the left is lifted it virtually increases in efficiency to an extent proportionate to the body of the mercury displaced by the plunger on the right in order to automatically counterbalance the excess of weight put upon the poising side of the beam. The mercury displaced by the plunger on the right flows from the corresponding cup into the other cup, or the one on the left, by way of the tube 160 and flows in the space left by the plunger on the left as it is lifted. It will therefore be evident that the supplemental recording device or wheel 152, which is connected directly with the beam 11, is moved a corresponding distance. Should the weight applied to the poising side of the beam be under the normal, just the opposite result will take place, so as to indicate light weight, and in the latter event the plunger on the left is dipped farther into the mercury to displace the same, while the effect of the plunger on the right is virtually increased. In weighing this supplemental poising means operates in connection with the auxiliary printing member so as to carry the same around the proper distance to indicate either light or heavy weights.

When testing, at which time the load-counterbalance 13 is lifted, the same operation with respect to the beam will follow, this being for the purpose of indicating the accuracy of the scale. If there be any preponderance of weight applied to one or the other side of the beam 11, this will be compensated for by the auxiliary counterbalancing means just described, the auxiliary recording device being moved in unison therewith.

In all cases the surface of mercury in the cups 159 remains the same.

The auxiliary poising means just set forth performs an important function during weighing. While the bucket 6 is being loaded the plunger 158 on the right is being lowered in the mercury in the cup, while the opposite action takes place with respect to the other plunger, and just before the load is completed the lower ends of the two plungers will be nearly in a horizontal line, by reason of which the plunger on the right as it is forced farther into the mercury can expel from its cup a quantity of said mercury, which flows therefrom into the other cup by way of the tube 160, sufficient to elevate the said plunger on the left to bring the lower edge of the latter into horizontal line with the lower edge of the other plunger before the full load is in the bucket, by virtue of which the valve-closing mechanism is thrown into action to effect the closing of the feed-valve 10. This, it will be understood, takes place before the full load is in the bucket. The balance of such load, which is a very small percentage thereof, enters the bucket after the valve has reached its fully-closed position. When the weighing mechanism is at a true poise, it will be found that the two plungers apply exactly equal forces to the opposite sides of the center of motion of the beam, and if there be neither under nor over weight upon said sides of the beam the latter will assume an exactly-poised position.

I have described means for securing a record of the loads as they are successively weighed and have also described means for lifting the load-counterweight 13 when it is desired to make a test. This testing of the scale occurs automatically in the present case after twenty loads have been discharged from the bucket, and it is necessary to secure a printed record of the test as soon as the beam is brought to rest. The same result will follow with respect to the auxiliary printing member or wheel 152, and if the weighing mechanism be at a true poise the zero-mark upon the auxiliary printing member will be brought opposite the printing-point. If the weighing mechanism should be weighing heavy or light, the proper character of the auxiliary printing device 152 will be brought opposite the printing-point, and when the said auxiliary printing device is at rest it will be locked momentarily in such position in the manner hereinbefore described, so that an impression can be made.

It will be remembered that the main printing member 150 is shiftably mounted, it having been set forth as bearing upon its printed surface characters one of which indicates the weight and the other an abbreviation of the word "balance," and said main printing member will be operated to bring the abbreviation "Bal." to the printing-point when a test is made. The printing member 150 has a depending curved stem 162 coöperative with the cam 163, rigid upon the outer end of the tubular shaft 123, the cam having a notch 164 in its periphery to receive the free end of the stem 162, the stem being held in contact with the cam by the spring 165, connected with a projection 166, extending laterally from the main printing member 150, said spring being also connected with some relatively fixed part and serving to hold the printing member with the pounds-mark thereon at the printing-point.

When the ratchet 124 is operated as hereinbefore described for lifting the load-counterbalance weight, the cam 163 on the tubular shaft 123 will be moved therewith, so that the free end of the stem 162 is caused to ride out of the let-off notch 164, it being carried entirely out of said notch at the time the weight is fully lifted. When the stem 162 is operated by the cam 163 in the manner just indicated, the printing member 150 will be operated to bring the abbreviated word "Bal." to the printing-point, and either the zero-mark or one of the fractional-pound marks indicating the heavy or light weight having been brought to the printing-point in line with the word "Bal." on the action of the auxiliary printing member 152 by the beam 11 the compression-block 81 will be then lowered in the manner hereinbefore described to bear it down upon the paper fed across the upper faces of the two printing members, so that the paper will receive an impression from said printing members. The imprint will be the abbreviated word "Bal.," followed by the symbol "0" if the weighing mechanism is at a true poise, or if it is not such fact will be indicated by the fractional marks followed either by the letters "L" or "H." As the cam 163 continues its rotation and as the compression-block 81 is being lifted the let-off notch 164 will be brought opposite the free end of the stem 162, so that the spring 165 can force the free end of said stem into said notch, thereby returning the printing member 150 to its initial position. I have hereinbefore described the normal feed of the ribbon of paper unwound from the roll 87. When a test is made, I provide means for cutting off the advance or leading end of the strip or that containing the prior records, and to do this I impart to the paper a feed in excess of the normal one. I have hereinbefore described the manner of normally feeding the paper, and will now set forth the means for securing the abnormal feed thereof. Normally the pawl 94 feeds the ratchet 95 a distance equaling one tooth of said ratchet, such feed movement being controlled by detent mechanism, which latter is so operated and timed that when a test is to be made said detent mechanism releases the pawl-carrier 93, so that it can be operated a distance to bring the pawl into position to feed the ratchet a distance equaling two teeth.

The ratchet 95 is provided upon its outer face with an annular flange 168, having a let-off recess 169. The lever 97 has at its free end a tooth or pallet 170, normally adapted when the pressure-block 81 is lowered to engage the said flange 168 to thereby restrict the throw of the pawl-carrier 93, so that the pawl is caused to travel a distance of one tooth backward, whereupon when the pressure-block is elevated said pawl, through the intermediate connections, can feed the coöperating ratchet the normal distance. At the time the weight 13 is lifted for making the test the recess or slot 169 will be automatically brought opposite the tooth 170 of the lever 97, so that when the block 81 is lowered the tooth 170 can enter said recess or slot 169 to permit an increased stroke of the pawl-carrier 93, and thereby permit the pawl to be moved rearwardly two teeth. Upon the elevation of the block the pawl therefore through the intermediate connections feeds the ratchet a distance equaling two teeth, which operation brings the flange 168 into the path of the tooth 170, so that on the depression of the said block the tooth is brought against the flange to thereby cause the pawl to resume its normal feed. After the ribbon of paper is fed the double distance the leading end thereof is severed and it drops upon the bottom of the casing 85, the latter in practice being provided with a door under lock and key.

In the casing 85 at the delivery end of the channel 90 is the knife or cutter 171, suitably secured to a yoke-shaped member 172, from which latter depends the stem 173, guided in a socket 174 in the casing 85. The knife coöperates with the fixed guide 175, against the under side of which the paper is fed. The under side of the yoke 172 is engaged by the periphery of the cam 163, the cam having a flat or knife-releasing face 176. The knife is moved into its working position by the spring 177, encircling the stem 173 and bearing, respectively, against the socket 174 and yoke 172. After the record has been printed upon the paper strip and the paper has been given the abnormal feed, the flat face 176 of the cam 163 will be brought into contact with the yoke 172, thereby releasing the said yoke, and consequently the knife 171, so that the spring can force the yoke and knife upward, so as to thrust the latter through the paper and sever off the length of paper, the strip cut off containing a record of twenty loads and also the record of the test. As the flat face 176 passes out of engagement with the yoke 172 the working face of said cam engages said yoke, so as to lower the yoke, and consequently the knife. The spring 178, connected with the yoke or knife-carrier 172 and also with the fixed part of the casing 85, holds the knife firmly against the fixed part or guide 175 during the cutting operation, so that a shearing and clean cut can be secured.

While the weight 13 is being lifted and when it has reached its uppermost position the guard 127 will have been brought into the path of the continuously-operating pawl 128, the single tooth 179 of the mutilated ratchet 125 being brought a distance from the pawl 138 equaling one tooth of said mutilated ratchet, so that when the connecting-rod 135 (see Fig. 20) is lowered by the rotation of the clutch member 54 to bring the pawl 138 into position to engage the single tooth of said mutilated ratchet, whereby on the continued motion of the said clutch member after the record has been printed and the rod 135 lifted the pawl 138 will be also lifted, so as to move the mutilated ratchet 125 the space of one tooth. As the mutilated ratchet 125 is thus moved the projection or auxiliary guard 127 will be carried out of the path of the continuously-operating pawl 128, whereby said pawl 128 can engage the teeth of the ratchet 124 and rotate the latter, and consequently through the intermediate connections lower the weight-carrying bracket 14 sufficiently to connect said weight with the beam 11. The rotation of the ratchet 124 by the pawl 128 after the guard 127 has released said pawl carries the pin 145 against the pin 146, the two being brought into contact the instant the pawl is released, so that on the continued rotation of the ratchet 124 the mutilated ratchet 125 will be carried around therewith to bring the series of teeth of the mutilated ratchet into position to be operated by the pawl 138 after the slip containing the records of twenty loads and the testing-record has been cut. As the main ratchet 124 rotates and at the moment the mutilated ratchet 125 has been carried to its original position the cam 132 will engage the intermediate arm of the angle-lever 131 and thrust the same outward, thereby moving the locking-arm 133 of said angle-lever from under the arm 140 and releasing said arm 140, and consequently the weight 118, so that said weight can drop and operate the locking-bolt 119 and couple the disk 100 and the continuously-operating gear 25 in the manner hereinbefore described, so that as said gear rotates it can through the described connections open the supply-valve 10 to again permit the supply-stream to flow into the empty bucket. Loosely carried upon the journal upon which the ratchet 68 rotates is an angle-lever 180, one arm of which is provided with a lateral projection 181, adapted to intermittently engage the fingers or bars 43 near their center of motion, so as to lift said fingers after they have been dropped in the manner hereinbefore described to their primary position. The other arm of the angle-lever 180 (see Fig. 8) is connected by a link 182 with the upper end of the crank-arm 183, fixed near one end of the rock-shaft 184, extending across the front of the machine, said rock-shaft having near its opposite end the inwardly-extending arm 185, adapted to coöperate with the cam 186, fixed to the tubular shaft or hub of the disk 100. Normally the projection 180 will be a slight distance below said fingers 43, so that said fingers can drop in the manner hereinbefore set forth, and when they have dropped they strike said projection. The rock-arm 185 normally bears against the flattened portion of the periphery of the cam 186, the fingers at this time being up and the lifting projection 181 therefore being slightly below the same. When the disk 100 is rotated in the manner hereinbefore described, the cam 186 will be moved therewith, so that the working portion of said cam can engage the arm 185 and thrust the same upward, thereby through intermediate connections moving the projection 181 in a corresponding direction until said fingers have been returned to their normal position. The cam 186 will continue to rotate until the projection 181 has been moved to its primary position a short distance below the two fingers. The two fingers 43 are usually returned to their initial positions before the beam resumes its position; but it sometimes happens that the poising side of the beam reaches such position before the fingers do, and to permit the latter to return to said normal position I make them of resilient material, so that their free ends can ride along the opposite and downwardly-converging faces of the triangular stop 45, the fingers being spread apart slightly during this action. When the said fingers are in line with the horizontal upper edge of the stop 45, they at once spring by their own action to their original position, so that they can be properly controlled by said stop.

In Figs. 10, 11, and 27 I show a modified auxiliary poising mechanism which may be employed instead of that hereinbefore described. The beam 11 at the counterpoising end thereof is connected by a link 187 with the lever 188, mounted for oscillation in the casing 185 and having at one end thereof the segment 189, meshing with a pinion 190 of the auxiliary printing member or wheel 152.

The beam 11, it being understood in this case, is connected indirectly with the auxiliary printing member which operates in the manner of that hereinbefore described. At equidistant points of the center of the lever extend sidewise the pins 191, (see Fig. 27,) projecting through slots 192 of the supplemental poise-weights 193, normally sustained by brackets 194 in the casing. The slots 192 are of progressively-increased lengths, commencing with the inner one, so that the weights can be successively lifted up by the lever 188 when the beam 11 is off a true poise. When there is an increase of weight beyond the standard put upon the poising side of the beam, the weights 193 are successively lifted, so as to counterbalance the excess, the auxiliary printing member being moved a distance sufficient to secure an indication of the excess upon the paper strip. If the weight applied to the poising side of the beam is beyond the normal, the opposite or right end of the lever will be lifted beyond a horizontal line, so that said right end of the lever will lift up the one or more weights to compensate for the lightness of the load.

Having described the invention, what I claim is—

1. The combination of a power-driven member, actuating mechanisms for the feed and discharge controllers of a weighing-machine, means for alternately connecting said actuating mechanisms with the power-driven member, a recording device, and means coöperative with one of said actuating mechanisms for causing the positive action of the recording device by said power-driven member.

2. The combination with a power-driven member, actuating mechanisms for the feed and discharge controllers of a weighing-machine, means for alternately connecting said actuating mechanisms with the power-driven member, a recording device, and means controlled by one of said actuating mechanisms for automatically putting the recording device into operative relation with the power-driven member to effect the action of said recording device.

3. The combination of a power-driven member, actuating mechanisms for the feed and discharge controllers of a weighing-machine, means for alternately connecting said actuating mechanisms to the power-driven member, a recording device, means controlled by one of said actuating mechanisms for automatically putting the recording device into operative relation with the power-driven member to effect the action of said recording device, a spool for containing a web of paper, said paper being adapted to receive a printed record from the recording device, and means for automatically feeding the paper.

4. The combination of weighing mechanism including a load-receiver and a discharge-controller, stream-supplying means for the load-receiver, a feed-controller, a power-shaft, mechanism operable by the power-shaft for actuating the feed-controller and discharge-controller in alternation, a recording device, and means coöperative with the weighing mechanism and operable by the power-shaft for effecting the automatic action of said recording device.

5. The combination of a power-driven member, actuating mechanisms for the feed and discharge controllers of a weighing-machine, means for alternately connecting the actuating mechanisms with the power-driven member, a recording device, means coöperative with one of said actuating mechanisms for automatically putting the recording device into operative relation with the power-driven member to effect the action of said recording device, means for supporting a web of paper which is adapted to receive a record from said recording device, feeding means for the paper, including a pawl and ratchet, and means coöperative with the recording device for actuating the pawl.

6. The combination of a power-driven member, actuating mechanisms for the feed and discharge controllers of a weighing-machine, means for alternately connecting said actuating mechanisms with the power-driven member, a recording device consisting of a printing member and a pressure member, means controlled by one of said actuating mechanisms and operable by the power-driven member for effecting the action of said pressure member, means for supporting a web of paper, said paper being adapted to receive a record from the recording device, and means coöperative with the pressure member for feeding the paper.

7. The combination of a power-driven member, actuating mechanisms for the feed and discharge controllers of a weighing-machine, means for alternately connecting the actuating mechanisms with the power-driven member, a recording device consisting of a printing member and a pressure member, means coöperative with one of said actuating mechanisms and operable by the power-driven member for effecting the action of said pressure member, means for supporting a roll of paper which is adapted to receive a record from the recording device, a pair of rolls between which the paper is adapted to pass, and means coöperative with the pressure member for imparting a feed movement to one of the rolls.

8. The combination of a power-driven member, actuating mechanisms for the feed and discharge controllers of a weighing-machine, means for alternately connecting the actuating mechanisms with the power-driven member, a recording device consisting of a printing member and a pressure member, means coöperative with one of said actuating mechanisms and operable by the power-driven member for effecting the action of said pressure member, means for supporting a roll of paper which is adapted to receive a record from the recording device, a pair of rolls between which the paper is adapted to pass, a ratchet connected with one of the rolls, a pawl for operating said ratchet, and means coöperative with the pressure member for actuating said pawl.

9. The combination of weighing mechanism including a load-receiver, a discharge-controller, and a load-counterpoise, stream-supplying means for the load-receiver, a feed-controller, a power-driven member, mechanism operable by the power-driven member for actuating the feed-controller and discharge-controller in alternation, a recording device, means coöperative with the weighing mechanism and operable by the power-driven member for effecting the action of the recording device, and means also controlled by the weighing mechanism for intermittently throwing said counterpoise out of coöperative relation with the weighing mechanism, said means being operable by the power-driven member.

10. The combination of a power-driven member, actuating mechanisms for the feed and discharge controllers of a weighing-machine, means for alternately connecting the actuating mechanisms with said power-driven member, a recording device, means coöperative with one of said actuating mechanisms for connecting the recording device with said power-driven member, means for supporting a roll of paper which is adapted to receive a record from said recording device, and means coöperative with the recording device for imparting a step-by-step motion to the paper.

11. The combination of a power-driven member, actuating mechanisms for the feed and discharge controllers of a weighing-machine, means for alternately connecting said actuating mechanisms with the power-driven member, a recording device, means coöperative with one of said actuating members for effecting the positive operation of the recording device by said power-driven member, means for supporting a web of paper which is adapted to receive a record from the recording device, and mechanisms coöperative with the recording device for feeding the paper and for intermittently severing the same.

12. The combination of a power-driven member, actuating mechanisms for the feed and discharge controllers of a weighing-machine, means for alternately connecting the mechanisms to the power-driven member, a recording device, means adapted to be connected with said power-driven member for effecting the action of said recording device, means for supporting a roll of paper, said paper being adapted to receive the record, means for normally imparting a step-by-step feed to the paper, means for effecting a feed of the paper in excess of the normal feed, and means for severing the paper after it has been fed the abnormal distance.

13. The combination of a power-driven member, actuating mechanisms for the feed and discharge controllers of a weighing-machine, means for alternately connecting said actuating mechanisms with said power-driven member, a recording device, means coöperative with one of said actuating mechanisms for putting the recording device into coöperative relation with said power-driven member to thereby effect the positive action of said recording device, means for supporting a roll of paper which is adapted to receive a record from the recording device, a pair of rolls between which the paper is adapted to travel, a ratchet connected with one of the rolls, a pawl for engaging said ratchet, a carrier for the pawls loose upon the arbor of one of the rolls, and means coöperative with the recording device for oscillating the pawl-carrier.

14. The combination of a power-driven member, weighing mechanism having a load-receiver, stream-supplying means for the load-receiver, a feed-controller, means for operating the feed-controller to start and stop the flow of the supply-stream, means for discharging the load from the load-receiver, operated by said power-driven member and controlled by the weighing mechanism, a recording device, and means also controlled by the weighing mechanism for effecting the action of the recording device by said power-driven member before the load is discharged from the load-receiver.

15. The combination of a power-driven member, weighing mechanism for a load-receiver, stream-supplying means for the load-receiver, a feed-controller, means for operating the feed-controller to start and stop the supply-stream, means for discharging the load from the load-receiver, said load-discharging means and the feed-controller-operating means being actuated by said power-driven member, a recording device, and means also actuated by the power-driven member and controlled by the weighing mechanism for effecting the action of the recording device after the stream is cut off and before the load is discharged from the load-receiver.

16. The combination of a power-driven member, actuating mechanisms for the feed and discharge controllers of a weighing-machine, means for alternately connecting said actuating mechanisms with the power-driven member, a recording device, means for connecting the recording device with the power-driven member, whereby said recording device will be automatically operated, and means coöperative with the recording device, for feeding a strip of paper for containing the record, normally a certain distance and at intervals a greater distance.

17. The combination of a power-driven member, actuating mechanisms for the feed and discharge controllers of a weighing-machine, means for alternately connecting said actuating mechanisms with the power-driven member, a recording device, means for connecting the recording device with the power-driven member, whereby said recording device will be automatically operated, means coöperative with the recording device, for feeding a strip of paper for containing the record, normally a certain distance and at intervals a greater distance, and means operable by said power-driven member for severing the paper after its abnormal movement.

18. The combination of a recording device, means for operating the recording device, rolls between which a strip of paper to contain a record is adapted to pass, a ratchet connected with one of the rolls and provided with a circular flange having a slot, a lever coöperative with the recording device and provided with a tooth to enter said slot, a pawl coöperative with the ratchet, and a carrier for the pawl connected with said lever.

19. The combination of a power-driven member, weighing mechanism, main and auxiliary printing members, the auxiliary printing member being operable by the weighing mechanism, a pressure member coöperative with said printing members, means for feeding a strip of paper between the printing members and pressure member, and mechanism actuated by the power-driven member for operating the pressure member on each operation of the weighing mechanism.

20. The combination of a power-driven member, weighing mechanism, main and auxiliary printing members, the auxiliary printing member being operable by the weighing mechanism, a pressure member coöperative with said printing members, means for feeding a strip of paper between the printing members and pressure member, normally a certain distance and at intervals a greater distance, mechanism actuated by the power-driven member for operating the pressure member on each operation of the weighing mechanism, and mechanism also operated by said power-driven member for severing the paper after its abnormal movement.

21. The combination of weighing mechanism including a load-receiver, stream-supply means for the load-receiver, a feed-controller, a power-driven shaft, a second shaft operatively connected with the feed-controller, a sleeve loose on said second shaft and operatively connected with the first shaft, a ratchet fastened to said sleeve, a pawl coöperative with the ratchet, an arm fixed to said second shaft carrying said pawl, and means controlled by the weighing mechanism for normally holding the pawl out of coöperative relation with the ratchet.

22. The combination of weighing mechanism including a load-receiver, stream-supplying means for the load-receiver, a feed-controller, a power-driven shaft, a second shaft coöperatively connected with the feed-controller, a sleeve loose on said second shaft and operatively connected with the said first-mentioned shaft, a ratchet rigid on said sleeve, a plurality of pawls coöperative with the ratchet, an arm fixed to said shaft and carrying said pawls, and means controlled by the weighing mechanism for normally holding the pawls out of coöperative relation with the ratchet.

23. The combination of weighing mechanism including a load-receiver, stream-supplying means for the load-receiver, a feed-controller, a power-driven shaft operatively connected with the feed-controller, a sleeve loose on said second shaft and operatively connected with the first shaft, a ratchet rigid on said sleeve, a pawl coöperative with the ratchet, an arm fixed to said second shaft and carrying said pawl, and a pivoted finger to which the pawl is connected and a part movable with the weighing mechanism adapted normally to engage the finger to hold the pawl out of engagement with the ratchet.

24. The combination of weighing mechanism including a load-receiver, stream-supply means for the load-receiver, a stream-controller, a power-driven shaft, a second shaft operatively connected with the feed-controller, a sleeve loose on said second shaft and operatively connected with the first shaft, a ratchet loose on said sleeve, a pawl coöperative with the ratchet, an arm fixed to said second shaft and carrying said pawls, pivoted fingers to which the pawls are connected, one of the fingers being longer than the other, and means movable with the weighing mechanism for normally engaging the fingers to hold the pawls out of coöperative relation with the ratchet.

25. The combination of weighing mechanism including a load-receiver, stream-supplying means for the load-receiver, a feed-controller, a power-driven shaft, a second shaft operatively connected with the feed-controller, a sleeve loose on said second shaft and operatively connected with the first shaft, a ratchet on said sleeve, a pawl coöperative with the ratchet, an arm fixed to said second shaft and carrying said pawl, means controlled by the weighing mechanism for normally holding the pawl out of coöperative relation with the ratchet, a clutch one of the sections of which is connected with the said first shaft, a recording device connected with the other clutch-section, a detent for normally holding the clutch-sections out of working relation, and means operable by said second shaft for throwing said detent into its ineffective position.

26. The combination of weighing mechanism including a load-receiver, stream-supplying means for the load-receiver, a feed-controller, a power-driven shaft, a second shaft operatively connected with the feed-controller, a sleeve loose on said second shaft and operatively connected with the first shaft, a ratchet on said sleeve, a pawl coöperative with the ratchet, an arm fixed to said second shaft and carrying said pawl, means controlled by the weighing mechanism for normally holding the pawl out of coöperative relation with the ratchet, a clutch one of the sections of which is connected with the said first shaft, a recording device connected with the other clutch-section, a detent for normally holding the clutch-sections out of working relation, an arm loose on said second shaft, a projection on the latter shaft for operating the last-mentioned arm, a ratchet having cam-shaped teeth, a pawl coöperative with the ratchet and connected with the last-mentioned arm for operation thereby, a shaft having an arm adapted to be operated by the second or cam-shaped ratchet, and a connection between said last-mentioned arm and the detent.

27. The combination of weighing mechanism including a load-receiver and a beam, stream-supplying means for the load-receiver, a feed-controller, a power-driven shaft, a second shaft operatively connected with the feed-controller, a sleeve loose on said second shaft and operatively connected with the first shaft, a ratchet rigid on said sleeve, a pawl coöperative with the ratchet, an arm fixed to said second shaft and carrying said pawl, a pivoted finger to which said pawl is connected, and a stop device upon the scale-beam adapted to be engaged by said pivoted finger.

28. The combination of weighing mechanism including a load-receiver and a beam, stream-supplying means for the load-receiver, a feed-controller, a power-driven shaft, a second shaft operatively connected with the feed-controller, a sleeve loose on said second shaft and operatively connected with the first shaft, a ratchet rigid on said sleeve, a pawl coöperative with the ratchet, an arm fixed to said second shaft carrying said pawl, a pivoted finger to which said pawl is operatively connected, and a triangular stop upon the beam having an upper horizontal edge adapted to uphold normally the free end of said finger.

29. The combination of weighing mechanism including a load-receiver, stream-supplying means for the load-receiver, a feed-controller, means for actuating the feed-controller into position to arrest the flow of the supply-stream, a recording device normally ineffective, means for actuating the recording device, and mechanism operative with the feed-controller-actuating means, for throwing the actuating means for the recording device into action after the feed-controller has reached a position to arrest the supply-stream.

30. The combination of weighing mechanism including a load-receiver, stream-supplying means for the load-receiver, a feed-controller, means for actuating the feed-controller into position to arrest the flow of the supply-stream, a recording device, normally ineffective means for actuating the recording device, mechanism operative with the feed-controller-actuating means for throwing the actuating means for the recording device into action after the feed-controller has reached the position to arrest the supply-stream, and mechanism controlled by the recording-device-actuating means, for effecting the discharge of the load, after a record has been made.

31. The combination of weighing mechanism including a load-receiver, stream-supplying means for the load-receiver, a feed-controller, a power-driven shaft, a second shaft operatively connected with the feed-controller, a sleeve loose on said second shaft and operatively connected with the first shaft, a ratchet rigid on said sleeve, a pawl coöperative with the ratchet, an arm fixed to said second shaft and carrying said pawl, a pivoted finger connected with the pawl, means for engaging the pivoted finger and normally holding the same in position for maintaining the pawl out of working relation with the ratchet and for releasing the same at a predetermined point whereby the finger can be automatically operated to put the pawl into its working position, and means independent of the weighing mechanism for returning the finger to its initial position.

32. The combination of weighing mechanism including a load-receiver, stream-supplying means for the load-receiver, a feed-controller, a power-driven shaft, a second shaft operatively connected with the feed-controller, a sleeve loose on said second shaft and operatively connected with the first shaft, a ratchet rigid on said sleeve, a pawl coöperative with the ratchet, an arm fixed to said second shaft and carrying said pawl, means controlled by the weighing mechanism for normally holding the pawl out of coöperative relation with the ratchet, a clutch one of the sections of which is connected with said first shaft, a recording device connected to the other clutch-section, a detent for normally holding the clutch-sections out of working relation, means operable by said second shaft for throwing said detent into its effective position, and means controlled by an intermittently-operative section of the clutch for effecting the discharge of the load from the load-receiver.

33. The combination of weighing mechanism including a load-receiver, stream-supplying means for the load-receiver, a feed-controller, a power-driven shaft, a second shaft operatively connected with the feed-controller, a sleeve loose on said second shaft and operatively connected with the first shaft, a ratchet rigid on said sleeve, a pawl coöperative with the ratchet, an arm fixed to said second shaft and carrying said pawl, means controlled by the weighing mechanism for normally holding the pawl out of coöperative relation with the ratchet, a clutch one of the sections of which is connected with the first shaft, a recording device connected to the other clutch-section, a detent for normally holding the clutch-sections out of working relation, means operable by said second shaft for throwing said detent into its ineffective position, a second clutch one of the sections of which is operatively connected with said first shaft, load-discharging means connected with the other or intermittently-operative section of the second clutch, a detent for normally holding the sections of the second clutch out of working relation, and means operable by the intermittently-movable section of the first-mentioned clutch for throwing the second detent into its ineffective position.

34. The combination of weighing mechanism having a load-receiver, a load-counterbalance and supplemental poising means, stream-supplying means, a feed-controller for controlling the flow of the stream, a discharge-controller for controlling the discharge from the load-receiver, a power-driven member, actuating mechanisms for the feed and discharge controllers, means governed by the weighing mechanism for alternately throwing the actuating mechanisms into coöperative relation with said power-driven member, and automatic mechanism coöperative with the weighing mechanism for automatically throwing the load-counterbalance out of working relation with the weighing mechanism after a series of operations of the latter.

35. The combination of weighing mechanism having a load-receiver, a load-counterbalance and supplemental poising means, stream-supplying means, a feed-controller for controlling the flow of the stream, a discharge-controller for controlling the discharge from the load-receiver, a power-driven member, actuating mechanisms for the feed and discharge controllers, means governed by the weighing mechanism for alternately throwing the actuating mechanisms into coöperative relation with said power member, automatic mechanism coöperative with the weighing mechanism for automatically throwing the load-counterbalance out of working relation with the weighing mechanism after a series of operations of the latter, a recording device, and means for throwing the recording device into coöperative relation with said power-driven member to thereby effect positive operation of the recording device.

36. The combination of a power-driven member having a load-counterbalance, main and auxiliary printing members, the auxiliary printing member being operable by the weighing mechanism, and pressure member coöperative with said printing members, means for feeding a strip of paper between said printing members and pressure member, mechanism actuated by the power-driven member for operating the pressure member on each operation of the weighing mechanism, mechanism for intermittently shifting the main printing member, and mechanism for throwing the load-counterbalance out of coöperative relation with the weighing mechanism when said main printing member is shifted.

37. The combination of weighing mechanism having a load-receiver and a weighted beam, the weight sustained by the beam being adapted to counterbalance the weight of the load in the load-receiver, a carrier for the weight supported independently of the beam, and means for automatically operating the carrier to lift the weight.

38. The combination of weighing mechanism having an oscillatory beam and plungers connected with the beam at opposite sides of its center of motion, communicating cups to receive said plungers, a load-counterbalance, a power-driven member, and means operated by said power-driven member for automatically throwing said load-counterbalance out of coöperative relation with the weighing mechanism, said means being governed by the action of the weighing mechanism.

39. The combination in a weighing mechanism having an oscillatory beam and plungers connected with the beam at opposite sides of its center of motion, communicating cups to receive said plungers, and a load-counterbalance, a power-driven member, means operated by said power-driven member for intermittently throwing said load-counterbalance out of coöperative relation with the weighing mechanism, main and auxiliary printing members, a pressure member coöperative with said printing members, means operated by said power-driven member for actuating the pressure member on each operation of the machine, means cooperative with the pressure member for feeding a strip of paper between the pressure and printing members, connections between the auxiliary printing member and the weighing mechanism, and mechanism operable by said power-driven member for intermittently shifting the main printing member.

40. The combination of a power-driven member, weighing mechanism having a discharge-controller and a load-counterbalance, means for supplying a stream of material to the weighing mechanism, a feed-controller for said stream of material, actuating mechanisms for the feed and discharge controllers, means for alternately connecting said actuating mechanisms with the power-driven member, main and auxiliary printing members, a pressure member coöperative with said printing members and operable by the power-driven member, means for feeding a strip of paper between said pressure and printing members, means for intermittently shifting the main printing member, and means operable by said power-driven member for throwing the load-counterbalance out of coöperative relation with the weighing mechanism while said main printing member is shifted.

41. The combination of a power-driven member, weighing mechanism having a discharge-controller and a load-counterbalance, means for supplying a stream of material to the weighing mechanism, a feed-controller for said stream of material, actuating mechanisms for the feed and discharge controllers, means for alternately connecting said actuating mechanisms with the power-driven member, main and auxiliary printing members, a pressure member coöperative with said printing members and operable by the power-driven member, means for feeding a strip of paper between said pressure and printing members, normally a certain distance and at intervals a greater distance, means for intermittently shifting the main printing member, means operable by the power-driven member for throwing the load-counterbalance out of coöperative relation with the weighing mechanism while said main printing member is shifted, and means for severing the paper after it has been fed the abnormal movement.

42. The combination of weighing mechanism including a scale-beam and a load-counterbalancing weight supported by said scale-beam, a weight-carrier for said weight, a power-driven member, and mechanism controlled by the action of the weighing mechanism for throwing the weight-carrier into coöperative relation with the power-driven member, whereby said weight-carrier will be reciprocated to first lift the weight and then lower the same.

43. The combination of weighing mechanism having a load-counterbalance, a carrier for said load-counterbalance supported independently of the weighing mechanism, a power-driven member, means coöperative with the weighing mechanism and actuated by the said power-driven member for shifting said carrier to thereby throw the load-counterbalance out of coöperative relation with the weighing mechanism, a recording device, and means for throwing the recording device into working relation with said power-driven member.

44. The combination of weighing mechanism including a scale-beam and a weight normally suspended by said scale-beam, a reciprocatory carrier for the said weight, a power-driven member, means coöperative with the weighing mechanism for putting the weight-carrier into working relation with said power-driven member to thereby reciprocate said weight-carrier, and a recording device connected with the weighing mechanism.

45. The combination of weighing mechanism having a load-receiver, feed and discharge controllers for controlling the supply of material to and the discharge of material from the load-receiver, actuating mechanisms for the feed and discharge controllers, a recording device, means for alternately connecting said actuating mechanisms with the power-driven member, said means being coöperative with the weighing mechanism, and means also coöperative with the weighing mechanism for putting the recording device into working relation with the power-driven member.

46. The combination of weighing mechanism, means for supplying a stream of material thereto to make up the load and for effecting the discharge of said load, a recording device, and means for intermittently automatically testing the accuracy of the weighing mechanism and simultaneously effecting the action of said recording device.

47. The combination of weighing mechanism, a main printing member and an auxiliary printing member, the latter being connected with the weighing mechanism for operation thereby, and means for shifting the main printing member after a series of operations of the weighing mechanism.

48. The combination of weighing mechanism having a load-counterbalance and supplemental poising means, main and auxiliary printing members, the auxiliary printing member being connected with the weighing mechanism for operation thereby, and means for shifting the main printing member after a series of operations of the weighing mechanism.

49. The combination of weighing mechanism having a load-counterbalance and supplemental poising means, main and auxiliary printing members, the auxiliary printing member being connected with the weighing mechanism for operation thereby, means for throwing the load-counterbalance out of coöperative relation with the weighing mechanism, and means for shifting the main printing member while the load-counterbalance is out of coöperative relation with the weighing mechanism.

50. The combination of weighing mechanism, a main printing member, an auxiliary printing member, means connected with the weighing mechanism for operating the auxiliary printing member upon each operation of the weighing mechanism, means for shifting the main printing member after a series of operations of the weighing mechanism, means for normally feeding the strip of paper a certain distance and for feeding said paper a greater distance after said main printing member has been shifted.

51. The combination of a main printing member, an auxiliary printing member, a pressure member coöperative with said printing members, means for operating the pressure member, means for supporting a strip of paper, said strip of paper being adapted to receive the impressions from said printing members, means for feeding the paper normally, a certain distance and at intervals a greater distance, means for severing the paper after its abnormal feed, and means for shifting the main printing member after a series of impressions have been made upon the paper.

52. The combination of weighing mechanism having a load-receiver, stream-supplying means for the load-receiver, a feed-controller, a rocker operatively connected with the feed-controller, a power-driven shaft, means controlled by the weighing mechanism for putting the rocker into operative relation with the power-driven shaft, a second rocker connected with the first rocker, a cam for operating the second rocker, means including a clutch coöperative with the cam and the said shaft, and means for normally holding the clutch-sections out of working relation.

53. The combination of weighing mechanism having a load-receiver, stream-supplying means for the load-receiver, a feed-controller, a rocker operatively connected with the feed-controller, a power-driven shaft, means controlled by the weighing mechanism for putting the rocker into operative relation with the power-driven shaft, a second rocker connected with the first rocker, a cam for operating the second rocker, means including a clutch coöperative with the cam and the said shaft, a recording device, mechanism operative after the cut-off of the stream for effecting the action of the recording device, and mechanism operable after the record has been taken for causing the members of the clutch to be put into working relation.

54. The combination of weighing mechanism having a load-receiver, stream-supplying means for the load-receiver, a feed-controller, a rocker operatively connected with the feed-controller, a power-driven shaft, means controlled by the weighing mechanism for putting the rocker into operative relation with the power-driven shaft, a second rocker connected with the first rocker, a cam for operating the second rocker, means including a clutch coöperative with the cam and the said shaft, means for normally holding the clutch-sections out of working relation and for causing their engagement after the load is made up, means for effecting the discharge of the load from the load-receiver, a regulator in position to receive the loads, and means connected with the regulator for disconnecting the sections of the clutch.

55. The combination of weighing mechanism having a load-receiver and a discharge-controller, stream-supplying means for the load-receiver, a feed-controller, a rocker operatively connected with the feed-controller, a power-driven shaft, means controlled by the weighing mechanism for putting said rocker into operative relation with the power-driven shaft, a second rocker connected with the first rocker, a cam operatively connected with the discharge-controller, means including a clutch coöperative with the cam and power-driven shaft, and means for normally holding the clutch-sections out of working relation.

56. The combination of weighing mechanism having a load-receiver and a discharge-controller, stream-supplying means for the load-receiver, a feed-controller, a rocker operatively connected with the feed-controller, a power-driven shaft, means controlled by the weighing mechanism for putting said rocker into operative relation with the power-driven shaft, a second rocker connected with the first rocker, a cam operatively connected with the discharge-controller, means including a clutch coöperative with the cam and power-driven shaft, a regulator in position to receive the loads discharged from the load-receiver, and means connected with the regulator for disconnecting the sections of the clutch.

57. The combination of two ratchets arranged in adjacence to each other, one of which is mutilated, a pawl for operating the other ratchet, said other ratchet having means for operating its companion, guards upon the mutilated ratchet adapted to prevent the operation of the companion ratchet by its pawl, and means for intermittently rotating the mutilated ratchet.

58. The combination of weighing mechanism including a load-counterbalancing weight, a carrier for said load - counterbalancing weight, primary and secondary ratchets arranged adjacent to each other, having coöperative coupling means, the secondary ratchet being mutilated and having guards adapted at times to prevent the operation of the primary ratchet by its pawl, a power-driven shaft, a pawl coöperative with the secondary ratchet and connected with said power-driven shaft for continuous operation thereby, connections between the weight-carrier and the primary ratchet for operating said weight-carrier, a pawl controlled by the weighing mechanism for intermittently operating the mutilated ratchet, a shiftable regulator to receive the loads discharged by the weighing mechanism, and a pawl operative with the regulator for also operating said mutilated ratchet.

59. The combination of weighing mechanism including a load-counterbalancing weight, a carrier for said load - counterbalancing weight, primary and secondary ratchets arranged adjacent to each other, having coöperative coupling means, the secondary ratchet being mutilated and having guards adapted at times to prevent the operation of the primary ratchet by its pawl, a power-driven shaft, a pawl coöperative with the secondary ratchet and connected with said power-driven shaft for continuous operation thereby, connections between the weight-carrier and the primary ratchet for operating said weight-carrier, a pawl controlled by the weighing mechanism for intermittently operating the mutilated ratchet, a shiftable regulator to receive the loads discharged by the weighing mechanism, a pawl operative with the regulator for also operating said mutilated ratchet, a recording device, and mechanism coöperative with the weighing mechanism for intermittently throwing the recording device into coöperative relation with said power-driven shaft.

60. The combination with a power-driven member, actuating mechanisms for the feed and discharge controllers of a weighing-machine, means for alternately connecting said actuating mechanisms with the power-driven member, a recording device, and means operated by the discharge-controller actuating mechanism for automatically putting the recording device into operative relation with the power-driven member to effect the action of said recording device.

61. The combination of a power-driven member, actuating mechanisms for the feed and discharge controllers of a weighing-machine, means for alternately connecting said actuating mechanisms with the power-driven member, a recording device, means controlled by one of said actuating mechanisms for automatically putting the recording device into operative relation with the power-driven member to effect the action of said recording device, means for carrying a web of paper, said paper being adapted to receive a printed record from the recording device, and means coöperative with the recording device for effecting the feed of the paper.

62. The combination of weighing mechanism having an oscillatory beam, and plungers connected with the beam at opposite sides of its center of motion, communicating cups to receive said plungers and to contain a liquid, each plunger serving to force a certain amount of liquid from its cup into the other cup on the motion of the scale-beam, the liquid thus acted on serving to counterbalance an excess in load or to equalize a deficiency in said load, and a recording device operative with the weighing mechanism to record the excess or the deficiency.

63. The combination of weighing mechanism having an oscillatory beam, a load-counterbalance, and plungers connected with the beam at opposite sides of its center of motion, communicating cups to receive said plungers and to contain a liquid, each plunger serving to force a certain amount of liquid from its cup into the other cup on the motion of the scale-beam, the liquid thus acted on serving to counterbalance an excess in load or to equalize a deficiency in said load, a recording device operative with the weighing mechanism to record the excess or the deficiency, and automatic mechanism for intermittently throwing the load-counterbalance out of operative relation with the beam.

64. The combination of weighing mechanism including a load-counterbalance, mechanism for throwing the load-counterbalance out of working relation with the weighing mechanism, and mechanism for testing the accuracy or balance of the weighing mechanism when the load-counterbalance is out of working relation therewith and securing a record of such test.

65. The combination of weighing mechanism including a load-counterbalance, mechanism for throwing the load-counterbalance out of working relation with the weighing mechanism after a series of operations of said weighing mechanism, and mechanism for testing the accuracy or balance of the weighing mechanism when the load-counterbalance is out of working relation therewith and securing a record of such test.

66. The combination of weighing mechanism including a scale-beam provided with a load-counterweight, mechanism for lifting the load-counterweight out of operative relation with the scale-beam, and mechanism for testing the accuracy or balance of the weighing mechanism when the load-counterweight is out of working relation therewith and securing a record of such test.

67. The combination of weighing mechanism having a scale-beam provided with a load-counterbalance and supplemental poising means, mechanism for throwing the load-counterbalance out of working relation with the scale-beam, and mechanism for testing the accuracy or balance of the weighing mechanism while the load-counterbalance is out of working relation with the beam, and securing a record of the test.

In testimony whereof I have hereunto set my hand in presence of two subscribing witnesses.

ULYSSES S. JAMES.

Witnesses:
A. C. PAUL,
C. G. HANSON.

---

Correction in Letters Patent No. 764,192.

It is hereby certified that the assignee in Letters Patent No. 764,192, granted July 5, 1904, upon the application of Ulysses S. James, of Anaconda, Montana, for an improvement in "Automatic Testing and Recording Machines for Weighing Machines or Scales," should have been described and specified in lhe heading of the printed specification as *The James Automatic Testing and Recording Scale Company, a Corporation of Delaware*, instead of "The James Automatic Testing and Recording Scale Company, a Corporation of Illinois;" and that the said Letters Patent should be read with this correction therein that the same may conform to the record of the case in the Patent Office.

Signed and sealed this 28th day of February, A. D., 1905.

[SEAL.]

F. I. ALLEN,
*Commissioner of Patents.*